(12) United States Patent
Paz et al.

(10) Patent No.: US 11,764,931 B2
(45) Date of Patent: Sep. 19, 2023

(54) ADAPTIVE USER EQUIPMENT-SPECIFIC TRACKING REFERENCE SIGNALS FOR SUB-TERAHERTZ SYSTEMS

(71) Applicant: QUALCOMM Incorporated, San Diego, CA (US)

(72) Inventors: Daniel Paz, Geva Carmel (IL); Michael Levitsky, Rehovot (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 17/590,570

(22) Filed: Feb. 1, 2022

(65) Prior Publication Data

US 2023/0246777 A1    Aug. 3, 2023

(51) Int. Cl.
*H04L 5/00*    (2006.01)

(52) U.S. Cl.
CPC .................. *H04L 5/0051* (2013.01)

(58) Field of Classification Search
CPC ..................... H04L 67/535; H04L 5/0051
See application file for complete search history.

(56) References Cited

U.S. PATENT DOCUMENTS

| 2019/0123864 A1 | 4/2019 | Zhang et al. | |
| 2020/0275523 A1* | 8/2020 | Zhang | .................. H04W 80/08 |

OTHER PUBLICATIONS

CATT: "Physical Layer Structure for NR Sidelink", 3GPP TSG RAN WG1 Meeting #99, R1-1912153, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, 22 Pages, XP051823234, Section 4.3, Section 8, Proposal 32, Section 4.1 2-stage SCI contents, Section 5.1.
Huawei, et al., "Sidelink Physical Layer Procedures for NR V2X", 3GPP TSG RAN WG1 Meeting #96, R1-1901537, 3rd Generation Partnership Project (3GPP), Mobile Competence Centre, 650, Route Des Lucioles, F-06921 Sophia-Antipolis Cedex, France, Mar. 1, 2019, 16 Pages, XP051599234, pp. 1-13, Section 2.3.3.
International Search Report and Written Opinion—PCT/US2023/011083—ISA/EPO—dated May 8, 2023.
(Continued)

*Primary Examiner* — Shukri Taha
(74) *Attorney, Agent, or Firm* — Holland & Hart LLP

(57) ABSTRACT

Methods, systems, and devices for wireless communications are described. A user equipment (UE) may receive a message from a network entity indicating a first set of configuration parameters for tracking reference signals (TRSs) specific to the UE. The UE may monitor for one or more TRSs according to the first set of configuration parameters and during a first time interval. The UE may receive a layer-1 (L1) signal or a layer-2 (L2) signal from the network entity indicating a second set of configuration parameters for the TRSs specific to the UE that are different from the first set of configuration parameters. The UE may transmit an acknowledgement message to the network entity indicating the UE received the L1 signal or the L2 signal. During a second time interval subsequent to the first time interval, the UE may monitor for additional TRSs according to the second set of configuration parameters.

30 Claims, 22 Drawing Sheets

(56) References Cited

OTHER PUBLICATIONS

Qualcomm Incorporated: "Enhancements on HST-SFN Deployment", 3GPP TSG-RAN WG1 Meeting #106-e, R1-2107327, 3rd Generation Partnership Project (3GPP), Mobile Competence Centre, 650, Route Des Lucioles, F-06921 Sophia-Antipolis Cedex, France, Aug. 16, 2021-Aug. 27, 2021, Aug. 7, 2021, 48 Pages, XP052038279, p. 9, 25, Section 5.

Samsung: "On Rate Matching", 3GPP TSG RAN WG1 Meeting 91, R1-1720351, 3rd Generation Partnership Project, Mobile Competence Centre, 650, Route Des Lucioles, F-06921 Sophia-Antipolis Cedex, France, vol. RAN WG1, No. Reno, USA, Nov. 27, 2017-Dec. 1, 2017 Nov. 18, 2017, XP051369930, pp. 1-8, Sections 1 and 2, 2.1, Subsection SS Block/PDSCH/DMRS Resource Conflict, p. 3 figure 2.

VIVO: "Further Discussion and Evaluation on HST-SFN Transmission Schemes", 3GPP TSG RAN WG1 #104b-e, R1-2102510, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 6, 2021, 17 Pages, XP051993114, Section 2.3.

\* cited by examiner

ADAPTIVE USER EQUIPMENT-SPECIFIC TRACKING REFERENCE SIGNALS FOR SUB-TERAHERTZ SYSTEMS

FIELD OF TECHNOLOGY

The following relates to wireless communications, including adaptive user equipment (UE)-specific tracking reference signals (TRSs) for sub-terahertz (sub-THz) systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities or one or more network access nodes, each simultaneously supporting communication for multiple communication devices, which may be otherwise known as user equipment (UE).

SUMMARY

The described techniques relate to improved methods, systems, devices, and apparatuses that support adaptive user equipment (UE)-specific tracking reference signals (TRSs) for sub-terahertz (sub-THz) systems. Generally, the described techniques provide for dynamically reconfiguring a TRS (e.g., a UE-specific TRS) and related parameters for a given UE. In some examples, a UE may receive a message, from a network entity indicating a first set of configuration parameters for UE-specific TRSs (e.g., configured by a network entity), which the UE may use to monitor for one or more TRSs during a first time interval. The first set of configuration parameters may include a periodicity, a bandwidth, and other parameters related to UE-specific TRSs. In some examples, the UE may receive a layer-1 (L1) signal or a layer-2 (L2) signal indicating a second set of configuration parameters for the UE-specific TRSs (e.g., configured by the network entity) that differ from the first set of configuration parameters. For example, the L1 signal or the L2 signal may include a medium access control (MAC) control element (MAC-CE) or downlink control information (DCI), which may dynamically indicate a reconfiguration of some configuration parameters. Accordingly, the UE may monitor for one or more additional TRSs using the second set of configuration parameters during a second time interval that is subsequent to the first time interval. By dynamically reconfiguring configuration parameters for UE-specific TRSs, the network entity may reduce signaling overhead and power consumption as the UE may use the parameters to monitor for TRS that are configured for that particular UE.

A method for wireless communications at a UE is described. The method may include receiving a message indicating a first set of configuration parameters for TRSs that are specific to the UE, monitoring, during a first time interval, for one or more TRSs according to the first set of configuration parameters based on the message, receiving an L1 signal or an L2 signal indicating a second set of configuration parameters for TRSs that are specific to the UE, where the second set of configuration parameters is different from the first set of configuration parameters, and monitoring, during a second time interval subsequent the first time interval, for one or more additional TRSs according to the second set of configuration parameters based on receiving the L1 signal or the L2 signal.

An apparatus for wireless communications at a UE is described. The apparatus may include a processor, memory coupled with the processor, and one or more instructions stored in the memory and executable by the processor to cause the apparatus to, based at least in part on the one or more instructions, receive a message indicating a first set of configuration parameters for TRSs that are specific to the UE, monitor, during a first time interval, for one or more TRSs according to the first set of configuration parameters based on the message, receive an L1 signal or an L2 signal indicating a second set of configuration parameters for TRSs that are specific to the UE, where the second set of configuration parameters is different from the first set of configuration parameters, and monitor, during a second time interval subsequent the first time interval, for one or more additional TRSs according to the second set of configuration parameters based on receiving the L1 signal or the L2 signal.

Another apparatus for wireless communications at a UE is described. The apparatus may include means for receiving a message indicating a first set of configuration parameters for TRSs that are specific to the UE, means for monitoring, during a first time interval, for one or more TRSs according to the first set of configuration parameters based on the message, means for receiving an L1 signal or an L2 signal indicating a second set of configuration parameters for TRSs that are specific to the UE, where the second set of configuration parameters is different from the first set of configuration parameters, and means for monitoring, during a second time interval subsequent the first time interval, for one or more additional TRSs according to the second set of configuration parameters based on receiving the L1 signal or the L2 signal.

A non-transitory computer-readable medium storing code for wireless communications at a UE is described. The code may include instructions executable by a processor to receive a message indicating a first set of configuration parameters for TRSs that are specific to the UE, monitor, during a first time interval, for one or more TRSs according to the first set of configuration parameters based on the message, receive an L1 signal or an L2 signal indicating a second set of configuration parameters for TRSs that are specific to the UE, where the second set of configuration parameters is different from the first set of configuration parameters, and monitor, during a second time interval subsequent the first time interval, for one or more additional TRSs according to the second set of configuration parameters based on receiving the L1 signal or the L2 signal.

In some examples of the method, apparatuses, and non-transitory computer-readable medium described herein, receiving the L1 signal or the L2 signal indicating the second set of configuration parameters may include operations, features, means, or instructions for receiving a MAC-CE indicating the second set of configuration parameters, where the TRSs include semi-persistent TRSs.

Some examples of the method, apparatuses, and non-transitory computer-readable medium described herein may further include operations, features, means, or instructions for receiving the MAC-CE indicating the second set of configuration parameters, where the MAC-CE includes a bitmap that indicates a subset of configuration parameters of the second set of configuration parameters and monitoring, during the second time interval, for the one or more additional TRSs according to the subset of configuration parameters based on receiving the MAC-CE.

Some examples of the method, apparatuses, and non-transitory computer-readable medium described herein may further include operations, features, means, or instructions for receiving a radio resource control (RRC) message indicating a set of multiple sets of configuration parameters for TRSs that may be specific to the UE that includes the second set of configuration parameters, where the TRSs include periodic or semi-persistent TRSs and receiving the L1 signal or the L2 signal indicating the second set of configuration parameters, where the L1 signal or the L2 signal includes a MAC-CE.

In some examples of the method, apparatuses, and non-transitory computer-readable medium described herein, receiving the L1 signal or the L2 signal indicating the second set of configuration parameters may include operations, features, means, or instructions for receiving DCI indicating the second set of configuration parameters, where the TRSs include periodic or semi-persistent TRSs.

Some examples of the method, apparatuses, and non-transitory computer-readable medium described herein may further include operations, features, means, or instructions for receiving an RRC message indicating a table including the second set of configuration parameters and receiving the DCI indicating the second set of configuration parameters based on receiving the RRC message.

Some examples of the method, apparatuses, and non-transitory computer-readable medium described herein may further include operations, features, means, or instructions for transmitting an acknowledgement message based on receiving the L1 signal or the L2 signal.

In some examples of the method, apparatuses, and non-transitory computer-readable medium described herein, the first set of configuration parameters and the second set of configuration parameters include at least one of a dynamic activation for semi-persistent TRSs, a dynamic deactivation for semi-persistent TRSs, a periodicity, a density in a frequency domain, a power boost, a bandwidth, a location within a bandwidth part (BWP), a quantity of symbols, a time gap, or any combination thereof In some examples of the method, apparatuses, and non-transitory computer-readable medium described herein, each configuration parameter of the first set of configuration parameters and each configuration parameter of the second set of configuration parameters corresponds to a resource set identifier.

In some examples of the method, apparatuses, and non-transitory computer-readable medium described herein, monitoring for the one or more TRSs may include operations, features, means, or instructions for monitoring for one or more periodic TRSs, one or more semi-persistent TRSs, one or more aperiodic TRSs, or any combination thereof In some examples of the method, apparatuses, and non-transitory computer-readable medium described herein, the UE operates in a sub-THz band.

A method for wireless communications at a base station is described. The method may include transmitting a message indicating a first set of configuration parameters for TRSs that are specific to a UE, transmitting, during a first time interval, one or more TRSs according to the first set of configuration parameters based on transmitting the message, transmitting an L1 signal or an L2 signal indicating a second set of configuration parameters for TRSs that are specific to the UE, where the second set of configuration parameters is different from the first set of configuration parameters, and transmitting, during a second time interval subsequent the first time interval, one or more additional TRSs according to the second set of configuration parameters based on transmitting the L1 signal or the L2 signal.

An apparatus for wireless communications at a base station is described. The apparatus may include a processor, memory coupled with the processor, and one or more instructions stored in the memory and executable by the processor to cause the apparatus to, based at least in part on the one or more instructions, transmit a message indicating a first set of configuration parameters for TRSs that are specific to a UE, transmit, during a first time interval, one or more TRSs according to the first set of configuration parameters based on transmitting the message, transmit an L1 signal or an L2 signal indicating a second set of configuration parameters for TRSs that are specific to the UE, where the second set of configuration parameters is different from the first set of configuration parameters, and transmit, during a second time interval subsequent the first time interval, one or more additional TRSs according to the second set of configuration parameters based on transmitting the L1 signal or the L2 signal.

Another apparatus for wireless communications at a base station is described. The apparatus may include means for transmitting a message indicating a first set of configuration parameters for TRSs that are specific to a UE, means for transmitting, during a first time interval, one or more TRSs according to the first set of configuration parameters based on transmitting the message, means for transmitting an L1 signal or an L2 signal indicating a second set of configuration parameters for TRSs that are specific to the UE, where the second set of configuration parameters is different from the first set of configuration parameters, and means for transmitting, during a second time interval subsequent the first time interval, one or more additional TRSs according to the second set of configuration parameters based on transmitting the L1 signal or the L2 signal.

A non-transitory computer-readable medium storing code for wireless communications at a base station is described. The code may include instructions executable by a processor to transmit a message indicating a first set of configuration parameters for TRSs that are specific to a UE, transmit, during a first time interval, one or more TRSs according to the first set of configuration parameters based on transmitting the message, transmit an L1 signal or an L2 signal indicating a second set of configuration parameters for TRSs that are specific to the UE, where the second set of configuration parameters is different from the first set of configuration parameters, and transmit, during a second time interval subsequent the first time interval, one or more additional TRSs according to the second set of configuration parameters based on transmitting the L1 signal or the L2 signal.

In some examples of the method, apparatuses, and non-transitory computer-readable medium described herein, transmitting the L1 signal or the L2 signal indicating the second set of configuration parameters may include operations, features, means, or instructions for transmitting a MAC-CE indicating the second set of configuration parameters, where the TRSs include semi-persistent TRSs.

Some examples of the method, apparatuses, and non-transitory computer-readable medium described herein may further include operations, features, means, or instructions for transmitting the MAC-CE indicating the second set of configuration parameters, where the MAC-CE includes a bitmap that indicates a subset of configuration parameters of the second set of configuration parameters and transmitting, during the second time interval, the one or more additional TRSs according to the subset of configuration parameters based on transmitting the MAC-CE.

Some examples of the method, apparatuses, and non-transitory computer-readable medium described herein may further include operations, features, means, or instructions for transmitting an RRC message indicating a set of multiple sets of configuration parameters for TRSs that may be specific to the UE that includes the second set of configuration parameters, where the TRSs include periodic or semi-persistent TRSs and transmitting the L1 signal or the L2 signal indicating the second set of configuration parameters, where the L1 signal or the L2 signal includes a MAC-CE.

In some examples of the method, apparatuses, and non-transitory computer-readable medium described herein, transmitting the L1 signal or the L2 signal indicating the second set of configuration parameters may include operations, features, means, or instructions for transmitting DCI indicating the second set of configuration parameters, where the TRSs include periodic or semi-persistent TRSs.

Some examples of the method, apparatuses, and non-transitory computer-readable medium described herein may further include operations, features, means, or instructions for transmitting an RRC message indicating a table including the second set of configuration parameters and transmitting the DCI indicating the second set of configuration parameters based on transmitting the RRC message.

Some examples of the method, apparatuses, and non-transitory computer-readable medium described herein may further include operations, features, means, or instructions for receiving an acknowledgement message based on transmitting the L1 signal or the L2 signal.

In some examples of the method, apparatuses, and non-transitory computer-readable medium described herein, the first set of configuration parameters and the second set of configuration parameters include at least one of a dynamic activation for semi-persistent TRSs, a dynamic deactivation for semi-persistent TRSs, a periodicity, a density in a frequency domain, a power boost, a bandwidth, a location within a BWP, a quantity of symbols, a time gap, or any combination thereof In some examples of the method, apparatuses, and non-transitory computer-readable medium described herein, each configuration parameter of the first set of configuration parameters and each configuration parameter of the second set of configuration parameters corresponds to a resource set identifier.

In some examples of the method, apparatuses, and non-transitory computer-readable medium described herein, transmitting the one or more TRSs may include operations, features, means, or instructions for transmitting one or more periodic TRSs, one or more semi-persistent TRSs, one or more aperiodic TRSs, or any combination thereof.

In some examples of the method, apparatuses, and non-transitory computer-readable medium described herein, the UE operates in a sub-THz band.

DETAILED DESCRIPTION

Figure 1:
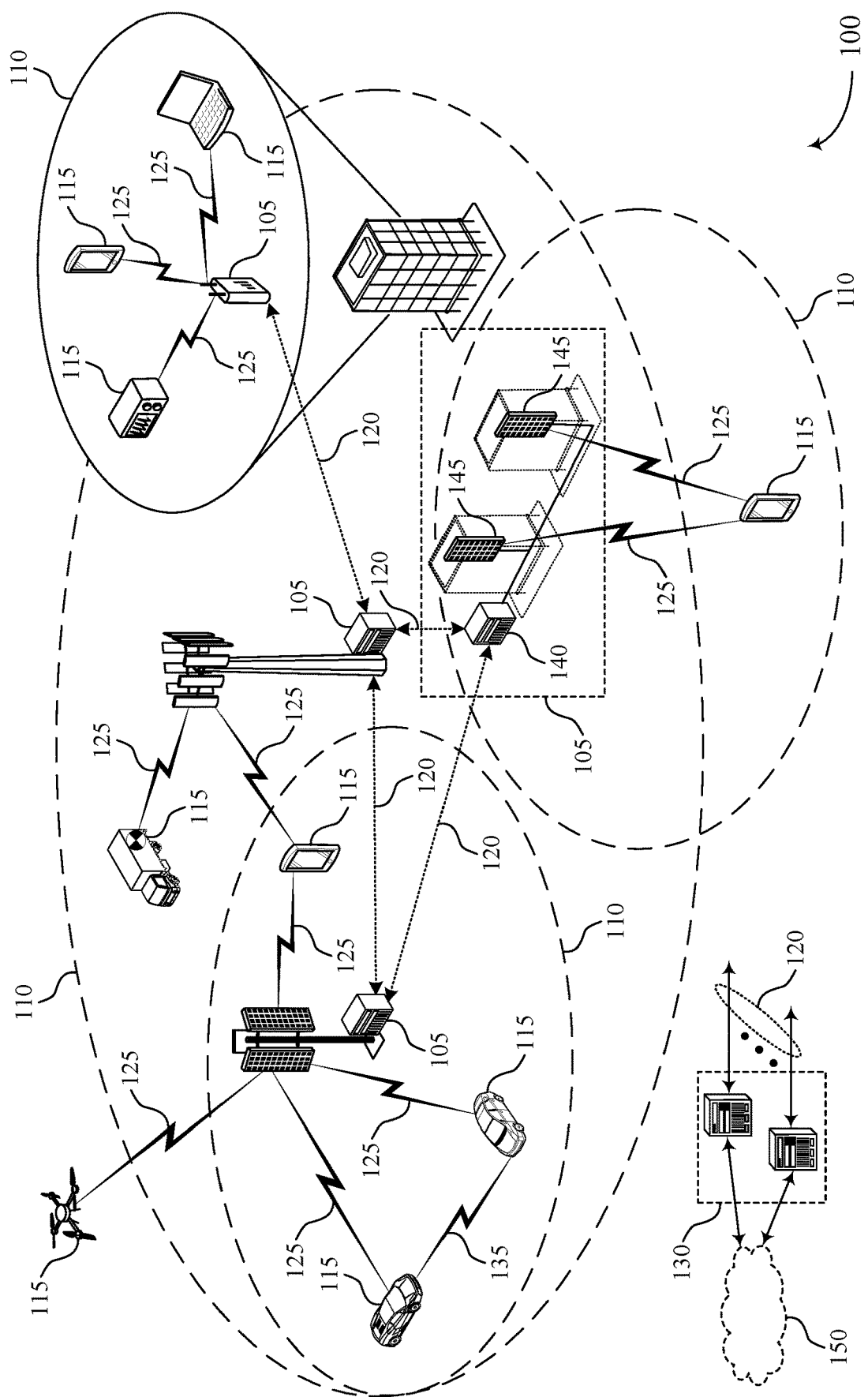
FIG. 1 illustrates an example of a wireless communications system that supports adaptive user equipment (UE)-specific tracking reference signals (TRSs) for sub-terahertz (sub-THz) systems in accordance with aspects of the present disclosure.

A tracking reference signal (TRS) may be a downlink reference signal used to estimate channel characteristics (e.g., delay spread) in a wireless communications system. In some examples, a TRS may be a cell-specific TRS, which may provide spatial coverage of a cell and serve all connected user equipments (UEs) in the cell. For example, a network entity may broadcast the same cell-specific TRS to all connected UEs in the cell, and each UE may use the same cell-specific TRS. In some other examples, a TRS may be a UE-specific TRS which may serve a single, specific UE. That is, each UE-specific TRS may be dynamically adapted for the particular UE it is intended for. In systems with a large quantity of connected UEs in a cell, a cell-specific TRS may be more efficient than a UE-specific TRS as a network entity may broadcast the cell-specific TRS to all of the UEs rather than individual UE-specific TRSs to each UE. However, in a sub-terahertz (sub-THz) system which may include relatively smaller cells and fewer UEs, it may be more efficient to use UE-specific TRSs than cell-specific TRSs. For example, using a cell-specific TRS in a sub-THz system and failing to dynamically adapt the cell-specific TRS and corresponding transmission parameters (e.g., periodicity, bandwidth) to each individual UE may increase signaling overhead and power consumption.

Techniques described herein provide for adapting UE-specific TRSs for sub-THz systems. For example, a network entity may dynamically reconfigure a UE-specific TRS and related parameters for a particular UE. In some examples, a UE may receive a message from a network entity indicating a first set of configuration parameters for UE-specific TRSs (e.g., configured by a network entity), which the UE may use to monitor for one or more TRSs during a first time interval. The first set of configuration parameters may include a periodicity, a bandwidth, and other parameters related to UE-specific TRSs. In some examples, the UE may receive a layer-1 (L1) signal or a layer-2 (L2) signal indicating a second set of configuration parameters for the UE-specific TRSs (e.g., configured by the network entity) that differ from the first set of configuration parameters. For example, the L1 signal or the L2 signal may include a medium access control (MAC) control element (MAC-CE) or downlink control information (DCI), which may dynamically indicate a reconfiguration of some configuration parameters. Accordingly, the UE may monitor for one or more additional TRSs using the second set of configuration parameters during a second time interval that is subsequent to the first time interval. By dynamically reconfiguring configuration parameters for UE-specific TRSs, the network entity may reduce signaling overhead and power consumption as the UE may use the parameters to monitor for TRS that are configured for that particular UE.

Aspects of the disclosure are initially described in the context of wireless communications systems. Aspects of the disclosure are then described in the context of dynamic signaling structures and process flows. Aspects of the disclosure are further illustrated by and described with reference to apparatus diagrams, system diagrams, and flowcharts that relate to adaptive UE-specific TRSs for sub-THz systems.

FIG. 1 illustrates an example of a wireless communications system 100 that supports adaptive UE-specific TRSs for sub-THz systems in accordance with aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The network entities 105 may be dispersed throughout a geographic area to form the wireless communications system 100 and may be devices in different forms or having different capabilities. The network entities 105 and the UEs 115 may wirelessly communicate via one or more communication links 125. Each network entity 105 may provide a coverage area 110 over which the UEs 115 and the network entity 105 may establish one or more communication links 125. The coverage area 110 may be an example of a geographic area over which a network entity 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the network entities 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, network entity 105, entity of a core network 130, apparatus, device, or computing system configured to perform any techniques described herein. For example, a network node may be a UE 115. As another example, a network node may be a network entity 105. As another example, a first network node may be configured to communicate with a second network node or a third network node. In one aspect of this example, the first network node may be a UE 115, the second network node may be a network entity 105, and the third network node may be a UE 115. In another aspect of this example, the first network node may be a UE 115, the second network node may be a network entity 105, and the third network node may be a network entity 105. In yet other aspects of this example, the first, second, and third network nodes may be different. Similarly, reference to a UE 115, a network entity 105, an apparatus, a device, or a computing system may include disclosure of the UE 115, network entity 105, apparatus, device, or computing system being a network node. For example, disclosure that a UE 115 is configured to receive information from a network entity 105 also discloses that a first network node is configured to receive information from a second network node. In this example, consistent with this disclosure, the first network node may refer to a first UE 115, a first network entity 105, a first apparatus, a first device, or a first computing system configured to receive the information; and the second network node may refer to a second UE 115, a second network entity 105, a second apparatus, a second device, or a second computing system.

The network entities 105 may communicate with the core network 130, or with one another, or both. For example, the network entities 105 may interface with the core network 130 through one or more backhaul links 120 (e.g., via an S1, N2, N3, or other interface). The network entities 105 may communicate with one another over the backhaul links 120 (e.g., via an X2, Xn, or other interface) either directly (e.g., directly between network entities 105), or indirectly (e.g., via core network 130), or both. In some examples, the backhaul links 120 may be or include one or more wireless links.

One or more of the network entities 105 described herein may include or may be referred to by a person having ordinary skill in the art as a base transceiver station, a radio network entity, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay network entities, among other examples, as shown in FIG. 1.

The UEs 115 and the network entities 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a network entity 105, or downlink transmissions from a network entity 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 may be movable and therefore provide communication coverage for a moving geographic coverage area 110. In some examples, different geographic coverage areas 110 associated with different technologies may overlap, but the different geographic coverage areas 110 may be supported by the same network entity 105. In other examples, the overlapping geographic coverage areas 110 associated with different technologies may be supported by different network entities 105. The wireless communications system 100 may include, for example, a heterogeneous network in which different types of the network entities 105 provide coverage for various geographic coverage areas 110 using the same or different radio access technologies.

The wireless communications system 100 may support synchronous or asynchronous operation. For synchronous operation, the network entities 105 may have similar frame timings, and transmissions from different network entities 105 may be approximately aligned in time. For asynchronous operation, the network entities 105 may have different frame timings, and transmissions from different network entities 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network entity 105. Other UEs 115 in such a group may be outside the geographic coverage area 110 of a network entity 105 or be otherwise unable to receive transmissions from a network entity 105. In some examples, groups of the UEs 115 communicating via D2D communications may utilize a one-to-many (1:M) system in which each UE 115 transmits to every other UE 115 in the group. In some examples, a network entity 105 facilitates the scheduling of resources for D2D communications. In other cases, D2D communications are carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a network entity 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or network entity 105 may be distributed across various network devices (e.g., radio heads and ANCs) or consolidated into a single network device (e.g., a network entity 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more network entity antennas or antenna arrays may be co-located at an antenna assembly, such as an antenna tower. In some examples, antennas or antenna arrays associated with a network entity 105 may be located in diverse geographic locations. A network entity 105 may have an antenna array with a number of rows and columns of antenna ports that the network entity 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beam forming operations. For example, a network entity 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times in different directions. For example, the network entity 105 may transmit a signal according to different beamforming weight sets associated with different directions of transmission. Transmissions in different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a network entity 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the network entity 105 in different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or radio frequency beamforming to generate a combined beam for transmission (e.g., from a network entity 105 to a UE 115). The UE 115 may report feedback that indicates precoding weights for one or more beam directions, and the feedback may correspond to a configured number of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook).

Although these techniques are described with reference to signals transmitted in one or more directions by a network entity 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the network entity 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a network entity 105 or a core network 130 supporting radio bearers for user plane data. At the physical layer, transport channels may be mapped to physical channels. In some examples, the layered protocol stack may support layer 3 (L3) (e.g., Radio Resource Control (RRC)) functionality and signaling. The layered protocol stack may include lower protocol layers, such as layer 1 (L1) (e.g., physical layer) and layer 2 (L2) (e.g., radio link control (RLC) layer, medium access control (MAC) layer, service data adaption protocol (SDAP), Packet Data Convergence Protocol (PDCP)) functionality and signaling, and different operations and functionality may be performed by different layers or split between two or more layers. L1 or L2 signals or signaling may refer to any signal generated at, or by one or more components associated with, the L1 or L2 protocol layers.

The UEs 115 and the network entities 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs regarding FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Some wireless communications systems 100 may support adaptive UE-specific TRSs for sub-THZ bands. A TRS may be a downlink reference signal (e.g., a CSI-RS or other reference signal) based on CSI-RS resources that may be used for estimating channel characteristics such as delay spread, power delay profile, Doppler correlation, other Doppler characteristics, thermal noise variance estimation, SNR, automatic gain control (AGC), synchronization loops estimation, or any combination thereof (e.g., in 5G systems). In some examples, a TRS may be based on or defined as a list of two or four CSI-RS resources used for channel characteristic tracking, synchronization loops tracking, or both once configured by a higher layer parameter (e.g., trs-Info=true) under a corresponding resource set (e.g., NZP-CSI-RS-ResourceSet). In addition, a TRS may be a broadcast signal (e.g., a cell-specific TRS) that may provide full spatial coverage of a cell. A network entity 105 may transmit a cell-specific TRS over all synchronization signal block (SSB) transmission beams in a manner similar to which an SSB signal may be transmitted. For example, the network entity 105 may use a list of TRS identifiers (which may be configured as always-on signals) transmitted over existing SSB beams to serve UEs 115 that are connected to the cell. In addition, each UE 115 connected to the cell may dynamically select to track one or more cell-specific TRSs that correspond to its current serving beam.

Given that that channels in sub-THz systems (e.g., in frequency range 5 (FR5) and beyond) may be relatively flat and static, a network entity 105 may primarily use a TRS in sub-THz systems for synchronization loops maintenance, where synchronization loops may be used for synchronizing transmitted and received signals in time and frequency to reduce data packet loss and network interruptions. In a sub-THZ system, a cell-specific TRS may be considered as a higher-bandwidth equivalent of an SSB (e.g., mutually replaceable in the context of synchronization loops tracking under particular conditions for the UEs 115 connected to the cell). In some examples, UEs 115 residing within a cell coverage range (e.g., of a network entity 105) may use an SSB that includes multiple synchronization signals (e.g., primary synchronization signals (PSSs), secondary synchronization signals (SSSs), physical broadcast channels (PBCHs)) to discover a cell and camp on or connect to the cell (e.g., an Init Acq procedure), to maintain a continuous time and frequency synchronization with the network entity 105, to perform beam management procedures, serving beam tracking, and AGC tracking (e.g., in a connected mode), to maintain serving cell and neighboring cell measurements that support mobility and handover procedures between cells, or any combination thereof.

In some examples, after camping on or connecting to a cell (e.g., after an Init Acq procedure) and after initial synchronization loops convergence, a network entity 105 and a UE 115 may maintain synchronization loops based on communicated SSBs, TRSs, or both, based on an SNR of the UE 115, a mobility, a channel flatness, periodicities of the SSBs, periodicities of the TRSs, or other factors. For example, for UEs 115 with sufficiently high SNRs (measure SNR above a threshold), tracking loops may be relatively more dynamic (e.g., less loop filtering, less loop averaging, and a higher loop filter bandwidth) and may operate with a lower rate of loop updates. Accordingly, UEs 115 may lack a relatively low SSB periodicity, a relatively low TRS periodicity, at particular times and still perform synchronization loops maintenance. Rather, a relatively low SSB periodicity, a relatively low TRS periodicity, or both may occur for initial acquisition and synchronization of UEs 115 at a cell edge of UEs 115 with poor SNR conditions (e.g., measured SNR below a threshold). However, given that TRSs and SSBs are broadcast signals, the TRSs and SSBs may target UEs 115 with such conditions.

In some cases, a network entity 105 may transmit a UE-specific TRS to each UE 115 connected to a cell supported by the network entity 105, such that each transmitted UE-specific TRS follows a specific UE serving beam. As such, UEs 115 may refrain from performing TRS switching since each UE 115 has a single TRS configured to it that dynamically follows the corresponding beam over which the network entity 105 serves the UE 115. A cell-specific TRS may be more efficient than UE-specific TRSs in cases with a high quantity of connected UEs 115 in the cell (e.g., where a network entity 105 may broadcast a cell-specific TRS used by multiple UEs 115). In addition, UE-specific TRSs may be more efficient than a cell-specific TRS in cases with a relatively small quantity of UEs 115 connected in a cell compared to a quantity of SSB or TRS beams used by the network entity 105 for full spatial coverage of the cell. That is, if there is a small quantity of UEs 115, transmitting a cell-specific TRS over all of the beams may waste resources and decrease efficiencies because the UEs 115 may use a very small subset of the beams.

In a sub-THz system, an increased quantity of narrower transmit beams (e.g., SSB beams) may be used to overcome efficiency and path loss-related limitations, while the quantity of UEs 115 in a sub-THz cell may be limited or relatively lower than in other bands (e.g., because of a smaller cell size in sub-THz systems). Accordingly, UE-specific TRSs may be more efficient than cell-specific TRSs in sub-THz systems as it may be more efficient to transmit UE-specific TRSs per UE 115 instead of transmitting cell-specific TRSs per transmit beam. In some cases, using UE-specific TRSs in sub-THz systems may enable dynamic TRS adaptation per UE 115 (e.g., because UE-specific TRSs may be unicast and used by single UEs 115 instead of multiple UEs 115). Transmitting UE-specific TRSs and dynamically adapting transmission parameters corresponding to each UE-specific TRS (e.g., activation, deactivation, periodicity, bandwidth, frequency and time domain patterns, and other parameters) may reduce reference signal overhead in the downlink and transmission power consumption compared to using cell-specific TRSs (e.g., broadcast TRS and SSB signals) without adapting transmission parameters that target UEs 115 close to a cell-edge and having a low SNR.

The wireless communications system 100 may support a network entity 105 adapting UE-specific TRSs by dynamically reconfiguring different configuration parameters and indicating the reconfigurations to particular UEs 115. In some examples, a UE 115 may receive a message from a network entity 105 indicating a first set of configuration parameters for UE-specific TRSs (e.g., configured by a network entity 105), which the UE 115 may use to monitor for one or more TRSs during a first time interval. The first set of configuration parameters may include a periodicity, a bandwidth, and other parameters related to UE-specific TRSs. In some examples, the UE 115 may the L1 signal or the L2 signal indicating a second set of configuration parameters for the UE-specific TRSs (e.g., configured by the network entity 105) that differ from the first set of configuration parameters. For example, the L1 signal or the L2 signal may include a MAC-CE or DCI, which may dynamically indicate a reconfiguration of some configuration parameters. Accordingly, the UE 115 may monitor for one or more additional TRSs using the second set of configuration parameters during a second time interval that is subsequent to the first time interval.

By dynamically reconfiguring configuration parameters for UE-specific TRSs, the network entity 105 may reduce signaling overhead and power consumption as the UE 115 may use the parameters to monitor for TRS that are configured for that particular UE 115. In addition, the described techniques may reduce signaling overhead for synchronization loops maintenance (e.g., by using an SSB and complementary TRS combination customized per UE 115) and improved synchronization loops pull-in-range (e.g., using a dynamic time gap between TRS symbols). In addition, the described techniques may support adapting TRSs per UE 115 or based on a scheduling scenario, and improved TRS coverage. In addition, the described techniques may reduce an RRC configuration volume as single TRSs are configured per UE 115, and support transparent TRS and TRS beam switching (e.g., a single TRS may be tailored to the serving beam of the corresponding UE 115).

Figure 2:
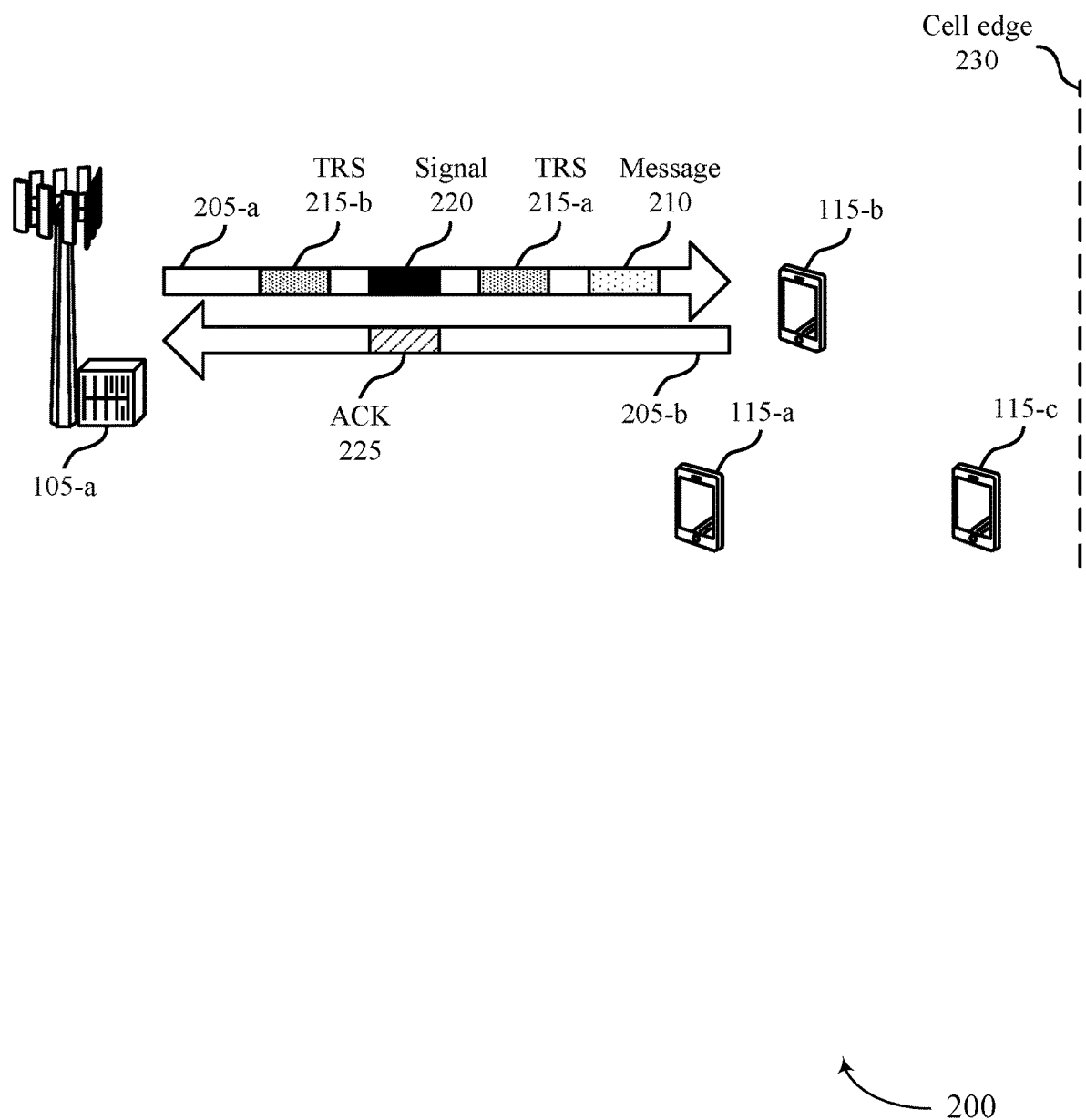
FIG. 2 illustrates an example of a wireless communications system that supports adaptive UE-specific TRSs for sub-THz systems in accordance with aspects of the present disclosure.

FIG. 2 illustrates an example of a wireless communications system 200 that supports adaptive UE-specific TRSs for sub-THz systems in accordance with aspects of the present disclosure. In some examples, the wireless communications system 200 may implement aspects of the wireless communications system 100 or may be implemented by aspects of the wireless communications system 100. For example, the wireless communications system 200 may include a UE 115-a, a UE 115-b, a UE 115-c, and a network entity 105-a, which may be examples of corresponding devices described herein. In some examples, the wireless communications system 200 may operate in a sub-THz band.

In some examples, a network entity 105-a may use UE-specific TRSs in a sub-THz system for synchronization loops maintenance. The network entity 105-a may maintain synchronization loops based on SSBs, the UE-specific TRSs, or a combination thereof depending on a particular rate of synchronization loop updates. Using UE-specific TRSs for such synchronization loops maintenance may enable dynamic UE-specific TRS adaptation per UE 115 based on channel conditions. For example, a UE 115 may move within a cell coverage range of the network entity 105-a closer to a cell edge 230 such that the SNR corresponding to the UE 115 may deteriorate closer to the cell edge 230, which may trigger the network entity 105-a to adapt a UE-specific TRS.

For different SNR ranges of the UEs 115, the network entity 105-a may adapt different configuration parameters associated with UE-specific TRSs (e.g., a periodicity), which may result in a particular TRS allocation rate for synchronization loops maintenance to minimize signaling overhead and related transmission power consumption. For example, the UE 115-a may be located relatively far from the cell edge 230 and relatively close to the network entity 105-a. The UE 115-a may have a high SNR (e.g., SNR>threshold 1), and TRSs may be deactivated for the UE 115-a such that the synchronization loops may be maintained based on SSBs (e.g., without the use of TRSs). In another example, the UE 115-b may be located closer to the cell edge 230 (e.g., halfway between the network entity 105-a and the cell edge 230). The UE 115-b may have a mid-range SNR (e.g., threshold 1>SNR>threshold 2), and TRSs with a high periodicity may be activated for the UE 115-b such that the synchronization loops may be maintained based on SSBs and TRSs. In addition, the UE 115-c may be located relatively close to the cell edge 230. The UE 115-c may have a low SNR (e.g., SNR<threshold 2), and TRSs with a low periodicity may be activated for the UE 115-c such that the synchronization loops may be maintained based on SSBs and TRSs.

In some examples, the UEs 115 may be in a connected mode (e.g., after initial acquisition and initial synchronization loop convergence), and the network entity 105-a may employ some SSB periodicity which may provide support for SSB-based procedures and targeting synchronization loops maintenance of connected UEs 115 having an SNR above some threshold (e.g., SNR>threshold 1). As a UE 115 moves closer to the cell edge 230, the network entity 105-a may use both TRSs and SSBs to maintain a sufficient synchronization loop update rate and synchronization accuracy. The network entity 105-a may configure configuration parameters for UE-specific TRSs based on the SNR conditions of a UE 115, and the network entity 105-a may transmit TRSs more frequently as the UE 115 moves from mid-tolow SNR (e.g., SNR<threshold 2). In some examples, other configuration parameters such as density in the frequency domain, a quantity of TRS symbols, power boosting, bandwidth, and any other configuration parameters may be addressed for UE-specific TRS adaptation to achieve a particular synchronization loop update rate or post-processing SNR.

The wireless communications system 200 may support adaptation and dynamic reconfiguration of configuration parameters for UE-specific TRSs in a sub-THz band. In some examples, the network entity 105-a may communicate with the UE 115-b via a communications link 205-a (e.g., a downlink) and a communications link 205-b (e.g., an uplink). In some examples, the UE 115-b may receive a message 210 from the network entity 105-a indicating a first set of configuration parameters for the UE-specific TRSs (e.g., TRSs that are specific to the UE 115-b). The UE 115-b may monitor for one or more TRSs 215 (e.g., a TRS 215-a) during a first time interval based on the message 210. That is, the TRS 215-a may be associated with a first TRS configuration corresponding to the first set of configuration parameters.

The network entity 105-a may dynamically reconfigure the first set of configuration parameters and dynamically signal an indication of the reconfiguration to the UE 115-b. For example, the UE 115-b may receive an L1 or L2 signal 220 indicating a second set of configuration parameters for UE-specific TRSs, where the second set of configuration parameters may be different from the first set of configuration parameters. Accordingly, the UE 115-b may monitor for one or more additional TRSs 215 (e.g., a TRS 215-b) according to the second set of configuration parameters during a second time interval subsequent to the first time interval. The TRS 215-b may be associated with a second TRS configuration corresponding to the second set of configuration parameters. In some examples, the UE 115-b may transmit an acknowledgement message 225 to the network entity 105-a indicating that the UE 115-b received the signal 220 indicating the reconfigured configuration parameters (e.g., the second set of configuration parameters).

In some examples, the TRS 215-a and the TRS 215-b may be periodic TRSs, semi-persistent TRSs, or aperiodic TRSs. For example, because an aperiodic TRS may be quasi co-located with a corresponding periodic TRS, a reconfiguration signaled for a periodic TRS or a semi-persistent TRS may also be applicable for the corresponding aperiodic TRS. That is, the network entity 105-a may reconfigure a periodic TRS or a semi-persistent TRS and an aperiodic TRS (e.g., if the aperiodic TRS is configured for the UE 115-b in a coupled manner) using the same indication, which may explicitly address the periodic TRS or the semi-persistent TRS by referencing a resource set identifier, and implicitly address the corresponding aperiodic TRS (e.g., such that the UE 115-b may apply the same reconfiguration for the aperiodic TRS resource set). The reconfiguration of periodic TRSs, semi-persistent TRSs, and aperiodic TRSs may be used for parameters that are defined (e.g., have a meaning) for the aperiodic TRSs. For example, a periodicity parameter may be irrelevant for the aperiodic TRSs, and as such, the network entity 105-a may refrain from configuring the periodicity parameter for aperiodic TRSs. In addition, the network entity 105-a may dynamically reconfigure the second set of configuration parameters at particular times (e.g., instead of on a per-slot or per-allocation basis).

In some examples, the L1 or L2 signal 220 may include a MAC-CE or a DCI. For example, the network entity 105-a may use a MAC-CE to indicate a reconfiguration of configuration parameters to the UE 115-b. Such a MAC-CE-based reconfiguration may address multiple configuration parameters upon the activation of a semi-persistent TRS, or multiple configuration parameters for periodic TRSs and semi-persistent TRSs that lack association with an activation event. In some other examples, the network entity 105-a may use a MAC-CE to indicate a dynamic selection of active configuration parameters. Additionally or alternatively, the network entity 105-a may use a non-scheduling DCI to explicitly or implicitly indicate the dynamic reconfiguration of parameters for periodic TRSs or semi-persistent TRSs.

As described herein, the first set of configuration parameters and the second set of configuration parameters may include at least one of a dynamic activation for semi-persistent TRSs, a dynamic deactivation for semi-persistent TRSs, a periodicity, a density in the frequency domain, a power boost, a bandwidth, a location within a BWP, a quantity of symbols, a time gap, or any combination thereof. The network entity 105-a may use dynamic reconfiguration of different configuration parameters to adapt a UE-specific TRS for a particular UE 115. In some cases, the network entity 105-a may transmit a periodic, semi-persistent, or aperiodic UE-specific TRS in the wireless communications system 200. For example, the TRSs 215 may include semi-persistent TRSs, which may be dynamically activated or deactivated with a periodic nature and periodicity adaptation (e.g., adaptive to varying channel conditions).

In some examples, the network entity 105-a may adapt and dynamically reconfigure the activation and deactivation of TRSs 215, which may be a semi-persistent TRS. Additionally or alternatively, the network entity 105-a may adapt and dynamically reconfigure a periodicity of the TRSs 215. In doing so, the network entity 105-a may dynamically reconfigure the periodicity of all CSI-RS resources included in a TRS resource set corresponding to the TRSs 215. In some cases, the network entity 105-a may reconfigure the periodicity per identifier associated with individual TRSs 215 or based on a TRS resource set identifier (e.g., which may be applicable for all CSI-RS resources included in the indicated TRS resource set). In some examples, the network entity 105-a may dynamically reconfigure the periodicity using an RRC parameter (e.g., NZP-CSI-RS-Resource.periodicityAndOffset). In some cases, the network entity 105-a may adapt a UE-specific TRS periodicity to one or multiple periodicities (e.g., 10 ms, 20 ms, 40 ms, 80 ms), which may include high periodicity options that are effectively close to deactivation (e.g., which a UE 115 may interpret as a deactivation) of a periodic UE-specific TRS until any next reconfiguration of the periodicity. In some examples, the UE 115-b may interpret a lack of a periodicity from the network entity as a non-active periodic resource. A configuration option for a periodic TRS with an absent periodicity field may be included in a list of TRS configurations that may be dynamically activated or selected with a MAC-CE or based on a non-scheduling DCI with implicit configuration signaling or selection from a predefined list of configuration options.

In some examples, the network entity 105-a may adapt and dynamically reconfigure a density of TRSs 215 in the frequency domain. For example, the network entity 105-a may dynamically reconfigure the density for all CSI-RS resources included in a corresponding TRS resource set using a single indication (e.g., indicated per TRS resource set identifier). In addition, the network entity 105-a may dynamically reconfigure the density using a particular RRC parameter (e.g., NZP-CSI-RS-Resource.ResourceMapping.density and NZP-CSI-RS-Resource.ResourceMapping.frequencyDomainAllocation). In some examples, for a single port of CSI-RS, the first and second rows of the CSI-RS mapping table may be applicable. In addition, the CSI-RS mapping table may be changed to include additional density options (e.g., by adding new rows to the table or adding more density options under existing rows). If the CSI-RS mapping table is unchanged, the first two rows (e.g., corresponding to a single port CSI-RS resource) may be applicable for UE-specific TRS configuration and reconfiguration. For sub-THz systems, the list of applicable densities of UE-specific TRSs in the frequency domain may increase to include densities $\rho=0.125$, $\rho=0.25$, $\rho=0.5$, and $\rho=1$ as sub-THz channels may be mostly flat in the frequency domain (e.g., with a lower delay spread compared to a system operating at a lower band).

Adapting and dynamically reconfiguring the density of UE-specific TRSs in the frequency domain may reduce signaling overhead by diluting frequency domain resources in a case of a high SNR (e.g., assuming a relatively flat channel) or when changing the periodicity of the TRS 215 may fail to achieve a targeted post-processing SNR and synchronization loop refresh rate (e.g., the density may be adjusted with a change in periodicity). In addition, adapting the density of TRSs 215 in the frequency domain may enhance the coverage and robustness of the TRSs 215 as a lower density may enable a higher boosting (e.g., and a corresponding higher SNR) on TRS resource elements, which may improve time offset and frequency offset estimation accuracy for a negative SNR.

In some examples, the network entity 105-a may adapt and dynamically reconfigure a power boosting associated with the TRSs 215. For example, the network entity 105-a may dynamically reconfigure a power boosting for all CSI-RS resources included in a corresponding TRS resource set using a single indication (e.g., based on a TRS resource set identifier). The network entity 105-a may reconfigure the power boosting using a particular RRC parameter (e.g., NZP-CSI-RS-Resource.powerControlOffset and NZP-CSI-RS-Resource.powerControlOffsetSS). In addition, adapting the power boosting may improve post-processing of the TRSs 215 and the coverage of the TRSs 215 in conjunction with changes to other configuration parameters (e.g., bandwidth), or may improve serving beam gain and refinement.

In some cases, the network entity 105-a may adapt and dynamically reconfigure a bandwidth of the TRSs 215 and the location of the TRSs within a BWP or a component carrier. For example, the network entity 105-a may dynamically reconfigure the bandwidth and location for all CSI-RS resources included in a TRS resource set using a single indication, and using a particular RRC parameter (e.g., NZP-CSI-RS-Resource.ResourceMappingfreqBand.startingRB and NZP-CSI-RS-Resource.ResourceMappingfreqBand.nofRBs). For sub-THz systems, a limitation on the bandwidth of the TRSs 215 may be modified or removed to enable more bandwidth flexibility for the TRSs 215, which may reduce associated signaling overhead. That is, the bandwidth of the TRSs 215 may be aligned or misaligned with a BWP bandwidth, such that the bandwidth may be smaller than, equal to, or greater than 28 or 32 resource blocks (e.g., based on a UE capability). The network entity 105-a may adapt the bandwidth in sub-THz systems, which may exhibit relatively flat and static channels, and where channel estimation may be performed based on a demodulation reference signal (DMRS) (e.g., without TRS assistance in the case that a UE 115 is static or has relatively low mobility with a short slot duration). As such, the network entity 105-a may configure a smaller bandwidth for the TRSs 215 to assist in synchronization loop maintenance, which may reduce signaling overhead.

In some examples, the network entity 105-a may adapt and dynamically reconfigure a quantity of TRS symbols (e.g., UE-specific TRS symbols). For example, the network entity 105-a may dynamically configure the quantity of TRS symbols based on a quantity of CSI-RS resources configured under a particular RRC parameter (e.g., NZP-CSI-RS-Resource, which may have the parameter trs-info=true configured). In some examples, the network entity 105-a may support one slot with two TRS symbols or two slots with four UE-specific TRS symbols (e.g., two TRS symbols per slot) per single TRS 215 occurrence. For sub-THz systems, to increase flexibility in the quantity of TRS symbols, the network entity 105-a may activate or deactivate UE-specific TRS resources (e.g., CSI-RS resources in a corresponding TRS resource set) selectively. For example, the network entity 105-a may use a bitmap with four bits to signal the activation or deactivation of a TRS-related CSI-RS resource. In some examples, adapting the quantity of the TRS symbols may improve a post-processing SNR and coverage of the TRSs 215 without changing other configuration parameters, or in conjunction with changing other configuration parameters (e.g., bandwidth, density in the frequency domain, and power boosting).

Additionally or alternatively, the network entity 105-a may adapt or dynamically reconfigure a TRS time gap. For example, the network entity 105-a may reconfigure locations of TRS symbols, a quantity of TRS symbols per UE-specific TRS allocation, or both. In some examples, the network entity 105-a may reconfigure the locations using a particular RRC parameter that is complementary to a new bundle TRS symbol location option (e.g., NZP-CSI-RS-Resource.ResourceMapping.firstOFDMSymbolInTimeDomain). For sub-THz systems, additional TRS location bundles with different time gaps (e.g., more or fewer than four symbols) may be used, and different time gap options may be coupled with a unique first TRS symbol location per slot such that the configuration of the first TRS symbol location may also indicate the corresponding time gap between two TRS symbols of a slot.

In some cases, a sub-THz system may have higher numerologies than in other frequency bands (e.g., frequency range 2 (FR2)) to better mitigate a strong phase noise expected in sub-THz carrier frequencies. As a result, the slot time may be relatively shorter and UE-specific TRS-based frequency offset estimation accuracy may be degraded if the same time gap between TRS symbols may be preserved. Accordingly, the network entity 105-a may configure a larger time gap between TRS symbols after a long UE sleep time with a potential drift of frequency offset during the sleep time, or because of a fast temperature variation upon wake-up procedures. The network entity 105-a may configure a smaller time gap between TRS symbols in a case of a low or a negative SNR, where synchronization loops variance may be higher, causing more significant frequency offset and time offset errors.

Figure 3:
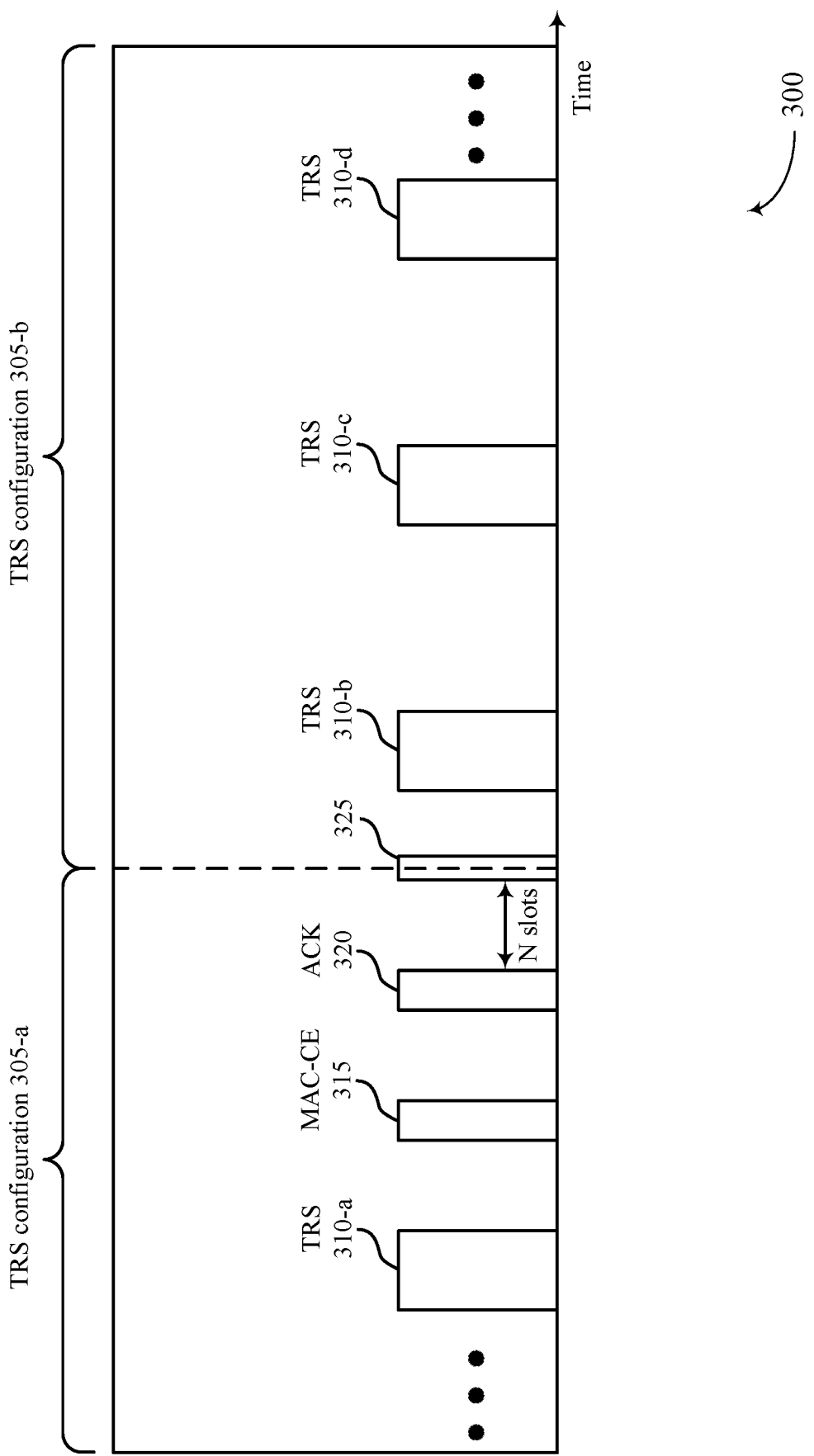
FIG. 3 through 5 illustrate examples of dynamic signaling structures that support adaptive UE-specific TRSs for sub-THz systems in accordance with aspects of the present disclosure.

FIG. 3 illustrates an example of a dynamic signaling structure 300 that supports adaptive UE-specific TRSs for sub-THz systems in accordance with aspects of the present disclosure. In some examples, the dynamic signaling structure 300 may be implemented by aspects of the wireless communications systems 100 and 200. For example, a network entity may dynamically reconfigure one or more configuration parameters associated with UE-specific TRSs and use dynamic signaling to indicate the reconfiguration to a UE.

As described with reference to FIG. 2, a UE may receive a message (e.g., RRC signaling) from a network entity indicating a first set of configuration parameters for UE-specific TRSs. During a first time interval, the UE may monitor for one or more TRSs 310 (e.g., periodic TRSs, semi-persistent TRSs) according to the first set of configuration parameters based on receiving the message. In some cases, the UE may receive an L1 signal or an L2 signal from the network entity indicating a second set of configuration parameters for UE-specific TRSs that is different from the first set of configuration parameters. Accordingly, the UE may monitor for one or more additional TRSs 310 (e.g., periodic TRSs, semi-persistent TRSs) during a second time interval subsequent to the first time interval according to the second set of configuration parameters. That is, the network entity may reconfigure the configuration parameters for a particular UE-specific TRS to decrease signaling overhead and power consumption.

In some examples, the one or more TRSs 310 associated with the first set of configuration parameters (e.g., a TRS 310-a) may correspond to a TRS configuration 305-a (e.g., TRS conf1), and the one or more additional TRSs 310 associated with the second set of configuration parameters (e.g., a TRS 310-b, a TRS 310-c, a TRS 310-d) may correspond to a TRS configuration 305-b (e.g., TRSconf2). The TRS configurations 305 may indicate active configuration parameters used to transmit particular TRSs 310. As such, the UE may monitor for the TRS 310-a having a TRS configuration 305-a during the first time interval, and for the TRS 310-b, the TRS 310-c, and the TRS 310-d having a TRS configuration 305-b during the second time interval. In addition, the TRSs 310 having the TRS configuration 305-a or the TRS configuration 305-b may each correspond to a first TRS resource set identifier (e.g., TRS resource set ID1).

In some examples, the L1 signal or the L2 signal may include a MAC-CE 315, which may carry an explicit indication of a reconfiguration (e.g., from the TRS configuration 305-a to the TRS configuration 305-b) for a subset of configuration parameters. For example, the UE may receive a PDSCH with the MAC-CE 315 indicating the second set of configuration parameters. In some cases, the MAC-CE 315 may address multiple configuration parameters upon activation of a TRS 310. That is, the network entity may activate a TRS 310 using the first TRS resource set identifier, which may be applied to all CSI-RS resources included in the indicated TRS resource set identifier. The network entity may indicate that the TRS 310 is activated using a dedicated bitmap field in the MAC-CE 315. For example, if the corresponding TRS resource set includes four CSI-RS resources and the MAC-CE 315 includes an activation bitmap field of [1100], the network entity may activate the first two CSI-RS resources (e.g., corresponding to the "1" bits in the bitmap) and refrain from activating the second two CSI-RS resources (e.g., corresponding to the "0" bits in the bitmap).

In some examples, the MAC-CE 315 may address multiple configuration parameters for periodic TRSs and semi-persistent TRSs that lack coupling to an activation event. For example, the MAC-CE 315 may indicate the reconfiguration of the multiple configuration parameters for activated and non-activated TRSs (e.g., the TRSs 310 and corresponding CSI-RS resources) before activation or during the time that the TRSs 310 are active. As such, the MAC-CE 315 may reconfigure configuration parameters for both periodic TRSs and semi-persistent TRSs. In some examples, the reconfiguration may be based on the first TRS resource set identifier, and may be applicable to all CSI-RS resources included in the first TRS resource set. For example, the reconfiguration may apply to the TRS 310-b, the TRS 310-c, and the TRS 310-d.

In some cases, the UE may transmit an acknowledgement message 320 to the network entity indicating that the UE received the PDSCH carrying the MAC-CE 315. After a period of N slots after the UE transmits the acknowledgement message 320 at 325, the TRS configuration 305-b may become applicable for the next transmissions of the TRSs 310 (e.g., the CSI-RS resources listed under the first TRS resource set identifier), including the TRS 310-b, the TRS 310-c, the TRS 310-d, and any other TRSs 310 until the UE receives another indication of a reconfiguration. That is, the TRS configuration 305-b may become active N slots after the UE transmits the acknowledgement message 320 for the corresponding PDSCH allocation that carried the MAC-CE 315.

Figure 4:
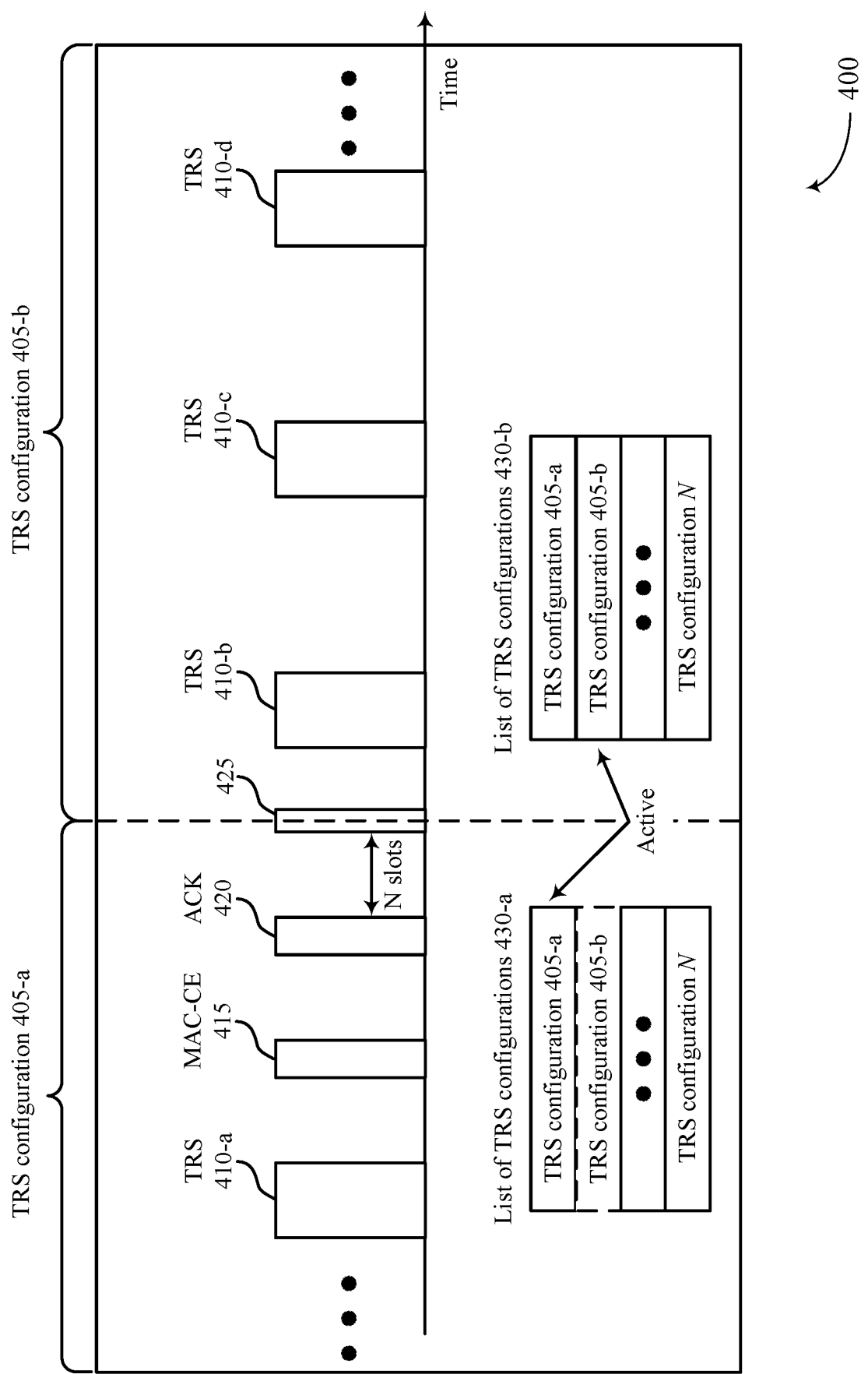

FIG. 4 illustrates an example of a dynamic signaling structure 400 that supports adaptive UE-specific TRSs for sub-THz systems in accordance with aspects of the present disclosure. In some examples, the dynamic signaling structure 400 may be implemented by aspects of the wireless communications systems 100 and 200. For example, a network entity may dynamically reconfigure one or more configuration parameters associated with UE-specific TRSs and use dynamic signaling to indicate the reconfiguration to a UE.

As described with reference to FIG. 2, a UE may receive a message (e.g., RRC signaling) from a network entity indicating a first set of configuration parameters for UE-specific TRSs. During a first time interval, the UE may monitor for one or more TRSs 410 (e.g., periodic TRSs, semi-persistent TRSs) according to the first set of configuration parameters based on receiving the message. In some cases, the UE may receive an L1 signal or an L2 signal from the network entity indicating a second set of configuration parameters for UE-specific TRSs that is different from the first set of configuration parameters. Accordingly, the UE may monitor for one or more additional TRSs 410 (e.g., periodic TRSs, semi-persistent TRSs) during a second time interval subsequent to the first time interval according to the second set of configuration parameters. That is, the network entity may reconfigure the configuration parameters for a particular UE-specific TRS to decrease signaling overhead and power consumption.

In some examples, the one or more TRSs 410 associated with the first set of configuration parameters (e.g., a TRS 410-a) may correspond to a TRS configuration 405-a (e.g., TRS conf1), and the one or more additional TRSs associated with the second set of configuration parameters (e.g., a TRS 410-b, a TRS 410-c, a TRS 410-d) may correspond to a TRS configuration 405-b (e.g., TRSconf2). The TRS configurations 405 may indicate active configuration parameters used to transmit particular TRSs 410. As such, the UE may monitor for the TRS 410-a having a TRS configuration 405-a during the first time interval, and for the TRS 410-b, the TRS 410-c, and the TRS 410-d having a TRS configuration 405-b during the second time interval. In addition, the TRSs 410 having the TRS configuration 405-a or the TRS configuration 405-b may each correspond to a first TRS resource set identifier (e.g., TRS resource set ID1).

The UE may receive the message from the network entity, which may indicate multiple pre-configured TRS configurations (e.g., via an RRC configuration) for periodic TRSs and semi-persistent TRSs. That is, the message may indicate a list of TRS configurations 430-a and a list of TRS configurations 430-b. Each list of TRS configurations 430 may include the TRS configuration 405-*a,* the TRS configuration 405-*b,* and any other N quantity of TRS configurations 405 that may be activated during a particular time interval. For example, the list of TRS configurations 430-*a* may indicate that the TRS configuration 405-*a* is active during the first time interval (e.g., for the transmission of the TRS 410-*a*). That is, the message may indicate a default configuration (e.g., the TRS configuration 405-*a*) that the network entity may apply before using any MAC-CE-based activation or indication which may down select one of the pre-configured TRS configurations.

In some examples, the L1 signal or the L2 signal may include a MAC-CE 415, which may indicate a dynamic selection of a TRS configuration 405 from the list of TRS configurations 430-*b* to be activated. That is, the network entity may dynamically activate (e.g., select, indicate) a TRS configuration 405 by transmitting a PDSCH including the MAC-CE 415. The TRS configuration 405 indicated in the MAC-CE 415 may become the active an TRS configuration 405 for the addressed TRS resource set until a next MAC-CE activation or reconfiguration. For example, the MAC-CE 415 may indicate the TRS configuration 405 as the active TRS configuration, and as such, the list of TRS configurations 430-*b* may indicate that the TRS configuration 405-*b* is the active TRS configuration 405 during the second time interval.

Based on receiving the MAC-CE 415, the UE may transmit an acknowledgement message 420 to the network entity indicating that the UE received the PDSCH carrying the MAC-CE 415. After a period of N slots after transmitting the acknowledgement message 420, at 425, the TRS configuration 405-*b* (e.g., indicated in the MAC-CE 415) may become active for the next transmissions of the TRS 410 (e.g., the CSI-RS resources listed under the first TRS resource set identifier), including the TRS 410-*b*, the TRS 410-*c*, the TRS 410-*d*, and any other TRSs 410 until the UE receives another indication of a reconfiguration. That is, the TRS configuration 405 indicated in the MAC-CE 415 may be applied for active and non-active semi-persistent TRSs (e.g., and corresponding CSI-RS resources).

Figure 5:
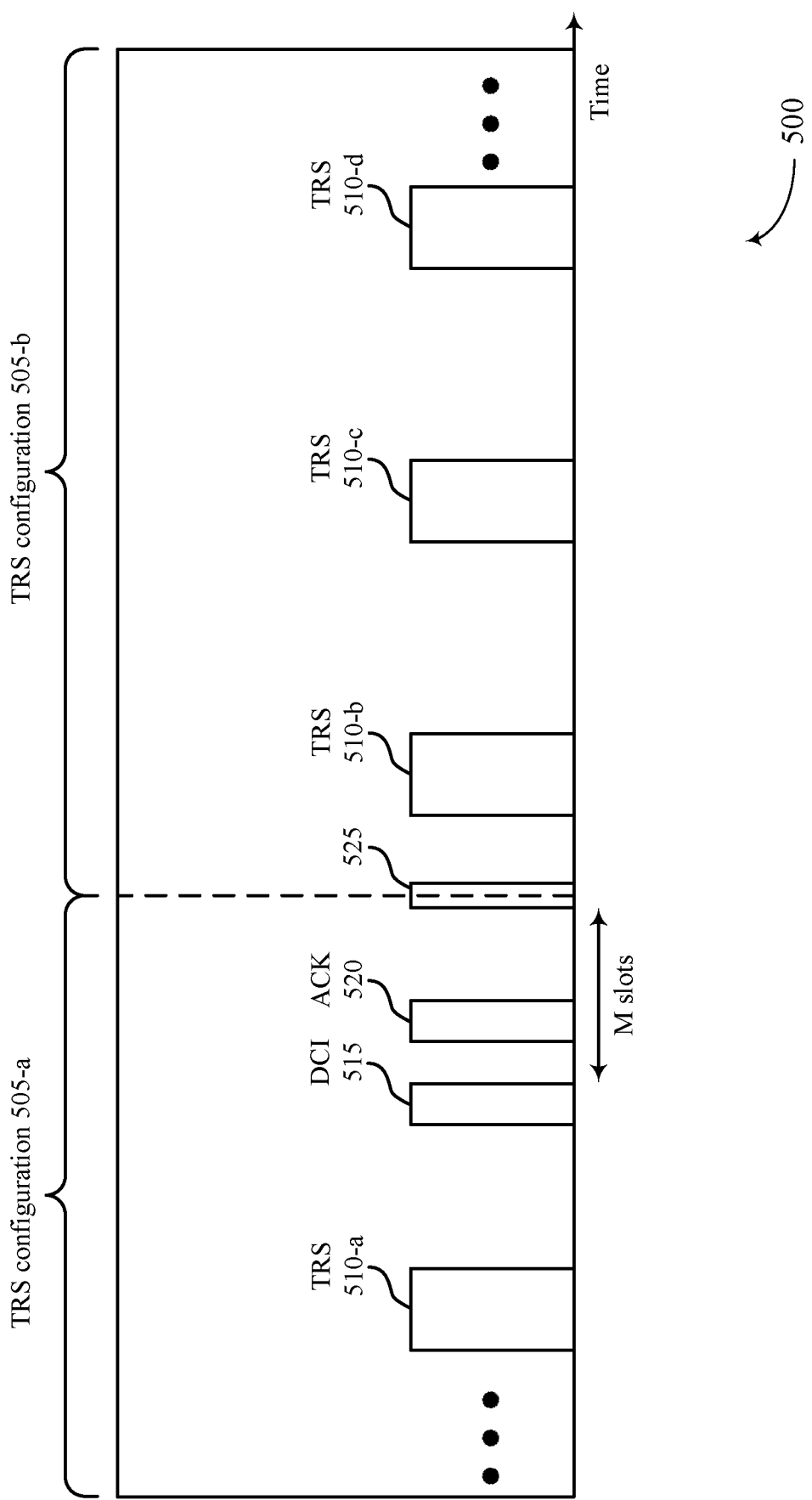

FIG. 5 illustrates an example of a dynamic signaling structure 500 that supports adaptive UE-specific TRSs for sub-THz systems in accordance with aspects of the present disclosure. In some examples, the dynamic signaling structure 500 may be implemented by aspects of the wireless communications systems 100 and 200. For example, a network entity may dynamically reconfigure one or more configuration parameters associated with UE-specific TRSs and use dynamic signaling to indicate the reconfiguration to a UE.

As described with reference to FIG. 2, a UE may receive a message (e.g., RRC signaling) from a network entity indicating a first set of configuration parameters for UE-specific TRSs. During a first time interval, the UE may monitor for one or more TRSs 510 (e.g., periodic TRSs, semi-persistent TRSs) according to the first set of configuration parameters based on receiving the message. In some cases, the UE may receive an L1 signal or an L2 signal from a network entity indicating a second set of configuration parameters for UE-specific TRSs that is different from the first set of configuration parameters. Accordingly, the UE may monitor for one or more additional TRSs 510 (e.g., periodic TRSs, semi-persistent TRSs) during a second time interval subsequent to the first time interval according to the second set of configuration parameters. That is, the network entity may reconfigure the configuration parameters for a particular UE-specific TRS to decrease signaling overhead and power consumption.

In some examples, the one or more TRSs 510 associated with the first set of configuration parameters (e.g., a TRS 510-*a*) may correspond to a TRS configuration 505-*a* (e.g., TRS conf1), and the one or more additional TRSs associated with the second set of configuration parameters (e.g., a TRS 510-*b*, a TRS 510-*c*, a TRS 510-*d*) may correspond to a TRS configuration 505-*b* (e.g., TRSconf2). The TRS configurations 505 may indicate active configuration parameters used to transmit particular TRSs 510. As such, the UE may monitor for the TRS 510-*a* having a TRS configuration 505-*a* during the first time interval, and for the TRS 510-*b*, the TRS 510-*c*, and the TRS 510-*d* having a TRS configuration 505-*b* during the second time interval. In addition, the TRSs 510 having the TRS configuration 505-*a* or the TRS configuration 505-*b* may each correspond to a first TRS resource set identifier (e.g., TRS resource set ID1).

In some examples, the L1 signal or the L2 signal may include a DCI 515 (e.g., a non-scheduling DCI), which may explicitly or implicitly indicate a dynamic reconfiguration of configuration parameters for the TRSs 510 (e.g., periodic TRSs and semi-persistent TRSs). In some cases, the message to the UE may include a pre-configured table of configuration parameters (e.g., RRC-configured configuration parameters). The network entity may dynamically indicate a TRS configuration 505 from the pre-configured table using the DCI 515, which may follow a non-scheduling DCI format dedicated for dynamic indication of the configuration parameters. The reconfiguration may be applied for all CSI-RS resources included in the corresponding TRS resource set.

In some cases, the UE may transmit an acknowledgement message 520 to the network entity indicating that the UE received the DCI 515. The TRS configuration 505-*b* may be activated after a predefined offset (e.g., M slots) relative to a slot index where the UE receives the DCI 515 (e.g., or after the UE transmits the acknowledgement message 520), at 525. The TRS configuration 505-*b* may override an RRC-configured TRS configuration or the TRS configuration 505 that is currently used (e.g., the TRS configuration 505-*a*). The TRS configuration 505-*b* may be activated for the next transmissions of the TRSs 510 including the TRS 510-*b*, the TRS 510-*c*, the TRS 510-*d*, and any other TRSs 510 until the UE receives another DCI indicating a reconfiguration. The DCI-based reconfiguration may be applied for active and non-active semi-persistent TRSs (e.g., the TRSs 510 and corresponding CSI-RS resources).

Figure 6:
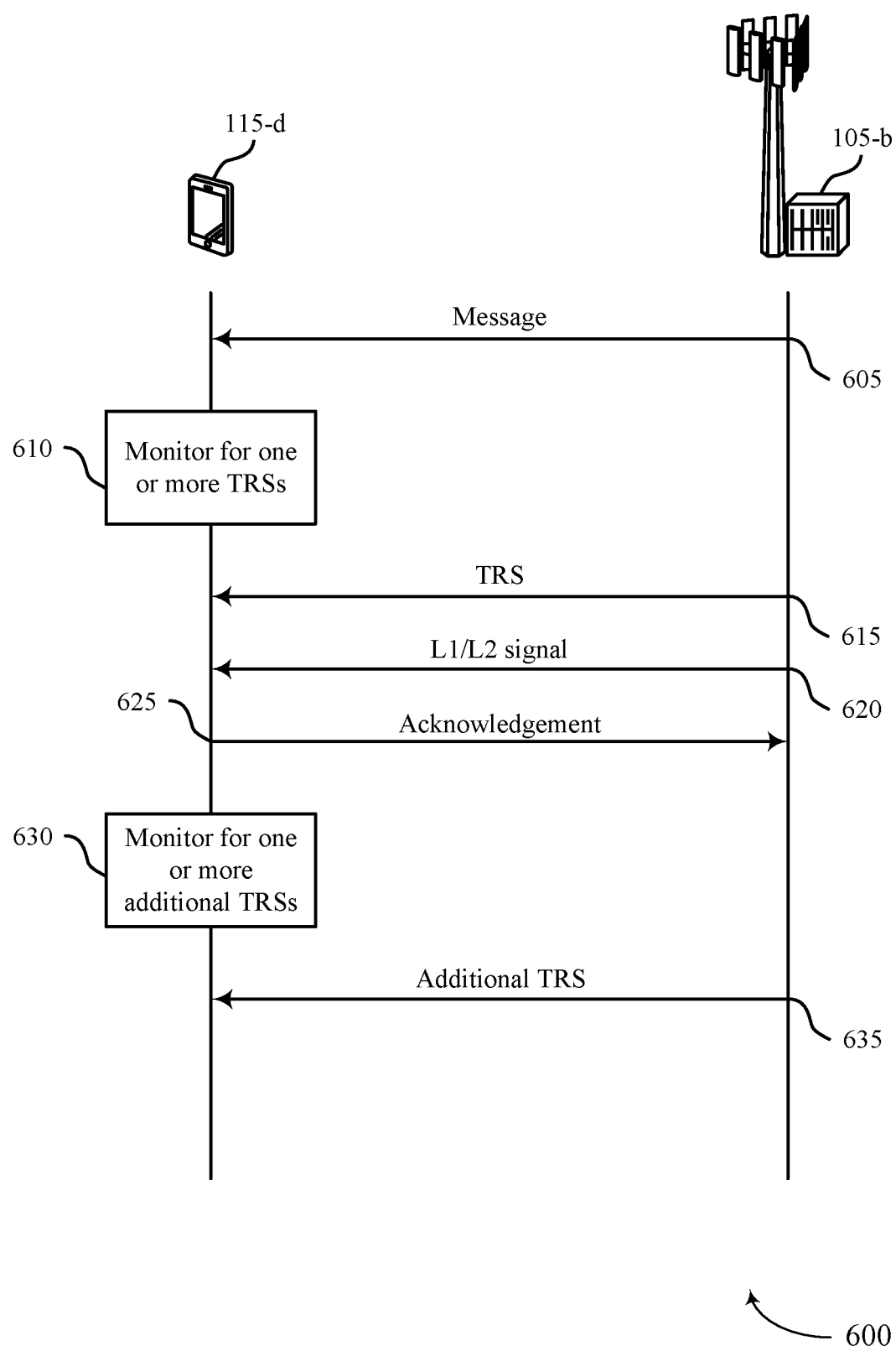
FIG. 6 illustrates an example of a process flow that supports adaptive UE-specific TRSs for sub-THz systems in accordance with aspects of the present disclosure.

FIG. 6 illustrates an example of a process flow 600 that supports adaptive UE-specific TRSs for sub-THz systems in accordance with aspects of the present disclosure. The process flow 600 may implement aspects of wireless communications systems 100 and 200, or may be implemented by aspects of the wireless communications system 100 and 200. For example, the process flow 600 may illustrate operations between a UE 115-*d* and a network entity 105-*b*, which may be examples of corresponding devices described herein. In the following description of the process flow 600, the operations between the UE 115-*d* and the network entity 105-*b* may be transmitted in a different order than the example order shown, or the operations performed by the UE 115-*d* and the network entity 105-*b* may be performed in different orders or at different times. Some operations may also be omitted from the process flow 600, and other operations may be added to the process flow 600.

At 605, the UE 115-d may receive, from the network entity 105-b, a message indicating a first set of configuration parameters for TRSs that are specific to the UE 115-d (e.g., UE-specific TRSs). The first set of configuration parameters may include at least one of a dynamic activation for semi-persistent TRSs, a dynamic deactivation for semi-persistent TRSs, a periodicity, a density in a frequency domain, a power boost, a bandwidth, a location within a BWP, a quantity of symbols, a time gap, or any combination thereof At 610, the UE 115-d may monitor, during a first time interval, for one or more TRSs according to the first set of configuration parameters based on the message. At 615, the network entity 105-b may transmit, to the UE 115-d and during the first time interval, the one or more TRSs according to the first set of configuration parameters. That is, the one or more TRSs may have a first TRS configuration.

At 620, the UE 115-d may receive, from the network entity 105-b, an L1 signal or an L2 signal indicating a second set of configuration parameters for TRSs that are specific to the UE 115-d, where the second set of configuration parameters is different from the first set of configuration parameters. In some examples, the second set of parameters may include at least one of a dynamic activation for semi-persistent TRSs, a dynamic deactivation for semi-persistent TRSs, a periodicity, a density in a frequency domain, a power boost, a bandwidth, a location within a BWP, a quantity of symbols, a time gap, or any combination thereof. Additionally or alternatively, the L1 signal or the L2 signal may include a MAC-CE that indicates one or more configuration parameters to be activated or a dynamic selection of an active TRS configuration, or a DCI which may implicitly or explicitly indicate a dynamic reconfiguration of the configuration parameters.

At 625, the UE 115-d may transmit, to the network entity 105-b, an acknowledgement message based on receiving the L1 signal or the L2 signal. The acknowledgement message may indicate that the UE 115-d received the L1 signal or the L2 signal indicating that the next transmitted TRSs may correspond to a TRS configuration indicated in the L1 signal or the L2 signal.

At 630, the UE 115-d may monitor, during a second time interval subsequent to the first time interval, for one or more additional TRSs according to the second set of configuration parameters based on receiving the L1 signal or the L2 signal. At 635, the network entity 105-b may transmit, to the UE 115-d and during the second time interval, the one or more additional TRSs according to the second set of configuration parameters. That is the one or more additional TRSs may have a second TRS configuration.

Figure 7:
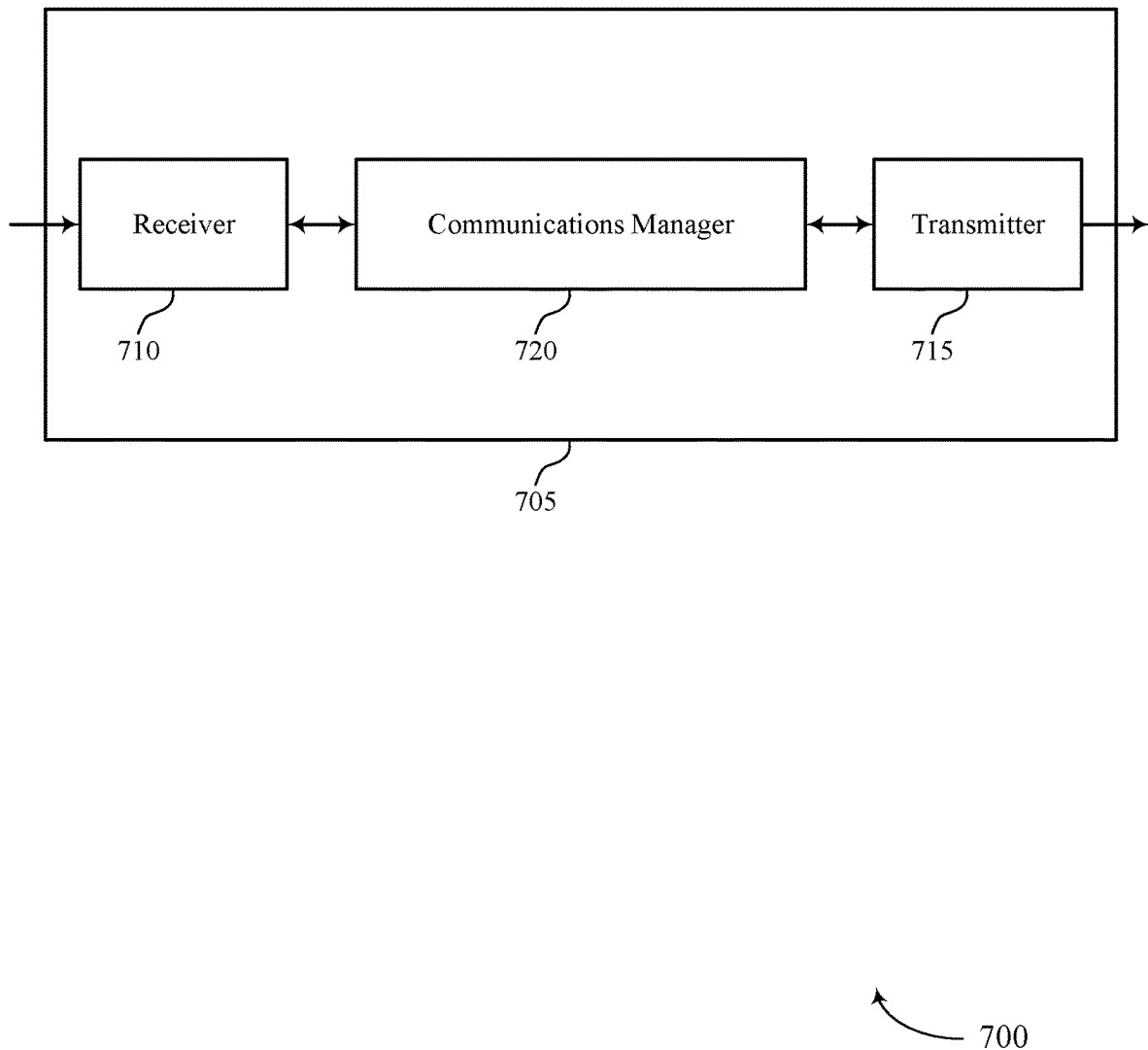
FIGS. 7 and 8 show block diagrams of devices that support adaptive UE-specific TRSs for sub-THz systems in accordance with aspects of the present disclosure.

FIG. 7 shows a block diagram 700 of a device 705 that supports adaptive UE-specific TRSs for sub-THz systems in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to adaptive UE-specific TRSs for sub-THz systems). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to adaptive UE-specific TRSs for sub-THz systems). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of adaptive UE-specific TRSs for sub-THz systems as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for receiving a message indicating a first set of configuration parameters for TRSs that are specific to the UE. The communications manager 720 may be configured as or otherwise support a means for monitoring, during a first time interval, for one or more TRSs according to the first set of configuration parameters based on the message. The communications manager 720 may be configured as or otherwise support a means for receiving an L1 signal or an L2 signal indicating a second set of configuration parameters for TRSs that are specific to the UE, where the second set of configuration parameters is different from the first set of configuration parameters. The communications manager 720 may be configured as or otherwise support a means for monitoring, during a second time interval subsequent the first time interval, for one or more additional TRSs according to the second set of configuration parameters based on receiving the L1 signal or the L2 signal.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for adapting and dynamically reconfiguring configuration parameters for UE-specific TRSs in sub-THz systems, which may decrease signaling overhead and power consumption. In addition, the described techniques may improve coverage of UE-specific TRSs and enable the optimization of UE-specific TRSs for one or more UEs.

Figure 8:
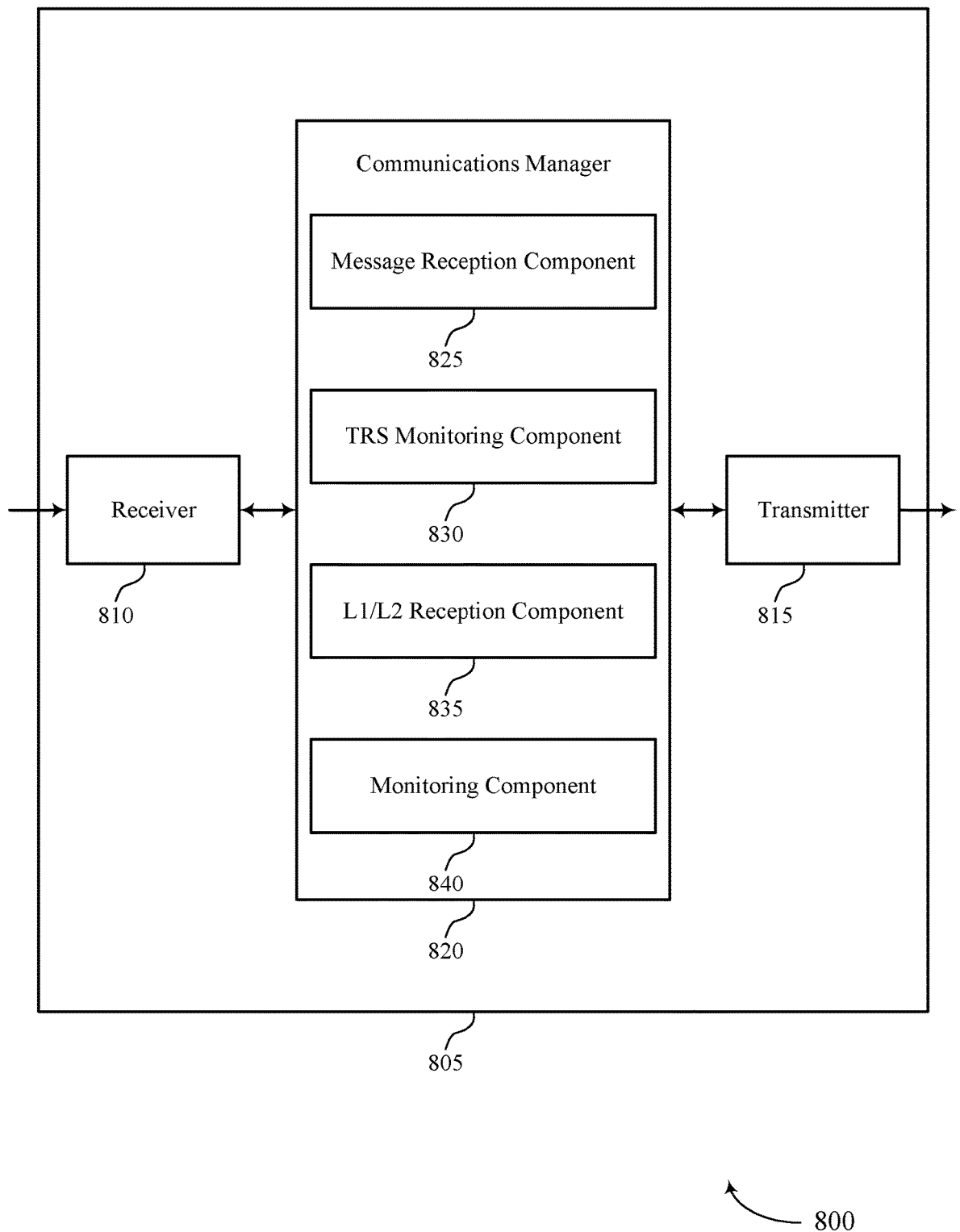

FIG. 8 shows a block diagram 800 of a device 805 that supports adaptive UE-specific TRSs for sub-THz systems in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to adaptive UE-specific TRSs for sub-THz systems). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to adaptive UE-specific TRSs for sub-THz systems). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of adaptive UE-specific TRSs for sub-THz systems as described herein. For example, the communications manager 820 may include a message reception component 825, an TRS monitoring component 830, a L1/L2 reception component 835, a monitoring component 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The message reception component 825 may be configured as or otherwise support a means for receiving a message indicating a first set of configuration parameters for TRSs that are specific to the UE. The TRS monitoring component 830 may be configured as or otherwise support a means for monitoring, during a first time interval, for one or more TRSs according to the first set of configuration parameters based on the message. The L1/L2 reception component 835 may be configured as or otherwise support a means for receiving an L1 signal or an L2 signal indicating a second set of configuration parameters for TRSs that are specific to the UE, where the second set of configuration parameters is different from the first set of configuration parameters. The monitoring component 840 may be configured as or otherwise support a means for monitoring, during a second time interval subsequent the first time interval, for one or more additional TRSs according to the second set of configuration parameters based on receiving the L1 signal or the L2 signal.

Figure 9:
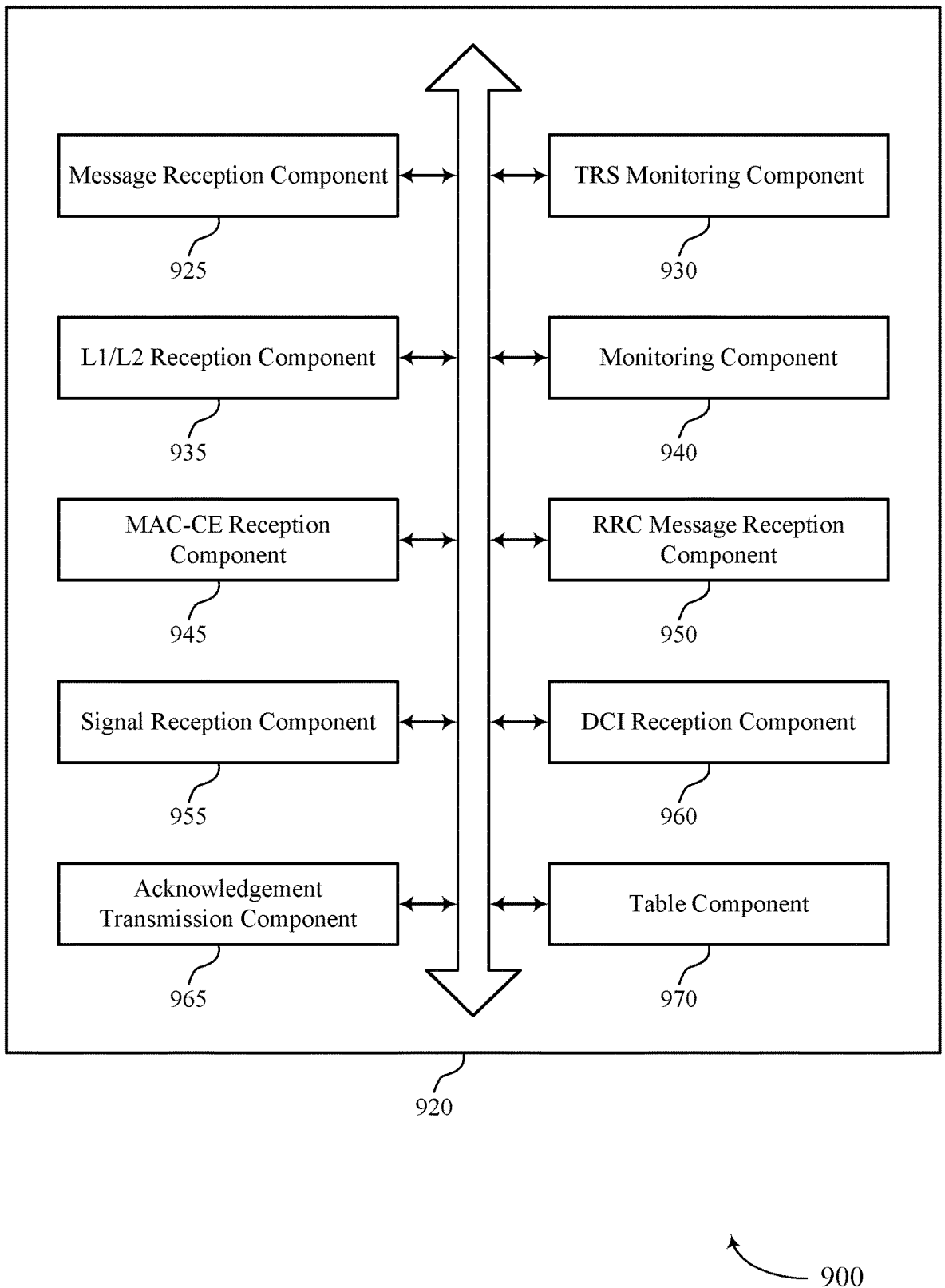
FIG. 9 shows a block diagram of a communications manager that supports adaptive UE-specific TRSs for sub-THz systems in accordance with aspects of the present disclosure.

FIG. 9 shows a block diagram 900 of a communications manager 920 that supports adaptive UE-specific TRSs for sub-THz systems in accordance with aspects of the present disclosure. The communications manager 920 may be an example of aspects of a communications manager 720, a communications manager 820, or both, as described herein. The communications manager 920, or various components thereof, may be an example of means for performing various aspects of adaptive UE-specific TRSs for sub-THz systems as described herein. For example, the communications manager 920 may include a message reception component 925, an TRS monitoring component 930, a L1/L2 reception component 935, a monitoring component 940, a MAC-CE reception component 945, an RRC message reception component 950, a signal reception component 955, a DCI reception component 960, an acknowledgement transmission component 965, a table component 970, or any combination thereof. Each of these components may communicate, directly or indirectly, with one another (e.g., via one or more buses).

The communications manager 920 may support wireless communications at a UE in accordance with examples as disclosed herein. The message reception component 925 may be configured as or otherwise support a means for receiving a message indicating a first set of configuration parameters for TRSs that are specific to the UE. The TRS monitoring component 930 may be configured as or otherwise support a means for monitoring, during a first time interval, for one or more TRSs according to the first set of configuration parameters based on the message. The L1/L2 reception component 935 may be configured as or otherwise support a means for receiving an L1 signal or an L2 signal indicating a second set of configuration parameters for TRSs that are specific to the UE, where the second set of configuration parameters is different from the first set of configuration parameters. The monitoring component 940 may be configured as or otherwise support a means for monitoring, during a second time interval subsequent the first time interval, for one or more additional TRSs according to the second set of configuration parameters based on receiving the L1 signal or the L2 signal.

In some examples, to support receiving the L1 signal or the L2 signal indicating the second set of configuration parameters, the MAC-CE reception component 945 may be configured as or otherwise support a means for receiving a MAC-CE indicating the second set of configuration parameters, where the TRSs include semi-persistent TRSs.

In some examples, the MAC-CE reception component 945 may be configured as or otherwise support a means for receiving the MAC-CE element indicating the second set of configuration parameters, where the MAC-CE includes a bitmap that indicates a subset of configuration parameters of the second set of configuration parameters. In some examples, the monitoring component 940 may be configured as or otherwise support a means for monitoring, during the second time interval, for the one or more additional TRSs according to the subset of configuration parameters based on receiving the MAC-CE.

In some examples, the RRC message reception component 950 may be configured as or otherwise support a means for receiving an RRC message indicating a set of multiple sets of configuration parameters for TRSs that are specific to the UE that includes the second set of configuration parameters, where the TRSs include periodic or semi-persistent TRSs. In some examples, the signal reception component 955 may be configured as or otherwise support a means for receiving the L1 signal or the L2 signal indicating the second set of configuration parameters, where the L1 signal or the L2 signal includes a MAC-CE.

In some examples, to support receiving the L1 signal or the L2 signal indicating the second set of configuration parameters, the DCI reception component 960 may be configured as or otherwise support a means for receiving DCI indicating the second set of configuration parameters, where the TRSs include periodic or semi-persistent TRSs.

In some examples, the table component 970 may be configured as or otherwise support a means for receiving an RRC message indicating a table including the second set of configuration parameters. In some examples, the DCI reception component 960 may be configured as or otherwise support a means for receiving the DCI indicating the second set of configuration parameters based on receiving the RRC message.

In some examples, the acknowledgement transmission component 965 may be configured as or otherwise support a means for transmitting an acknowledgement message based on receiving the L1 signal or the L2 signal.

In some examples, the first set of configuration parameters and the second set of configuration parameters include at least one of a dynamic activation for semi-persistent TRSs, a dynamic deactivation for semi-persistent TRSs, a periodicity, a density in a frequency domain, a power boost, a bandwidth, a location within a BWP, a quantity of symbols, a time gap, or any combination thereof. In some examples, each configuration parameter of the first set of configuration parameters and each configuration parameter of the second set of configuration parameters corresponds to a resource set identifier.

In some examples, to support monitoring for the one or more TRSs, the TRS monitoring component 930 may be configured as or otherwise support a means for monitoring for one or more periodic TRSs, one or more semi-persistent TRSs, one or more aperiodic TRSs, or any combination thereof. In some examples, the UE operates in a sub-THz band.

Figure 10:
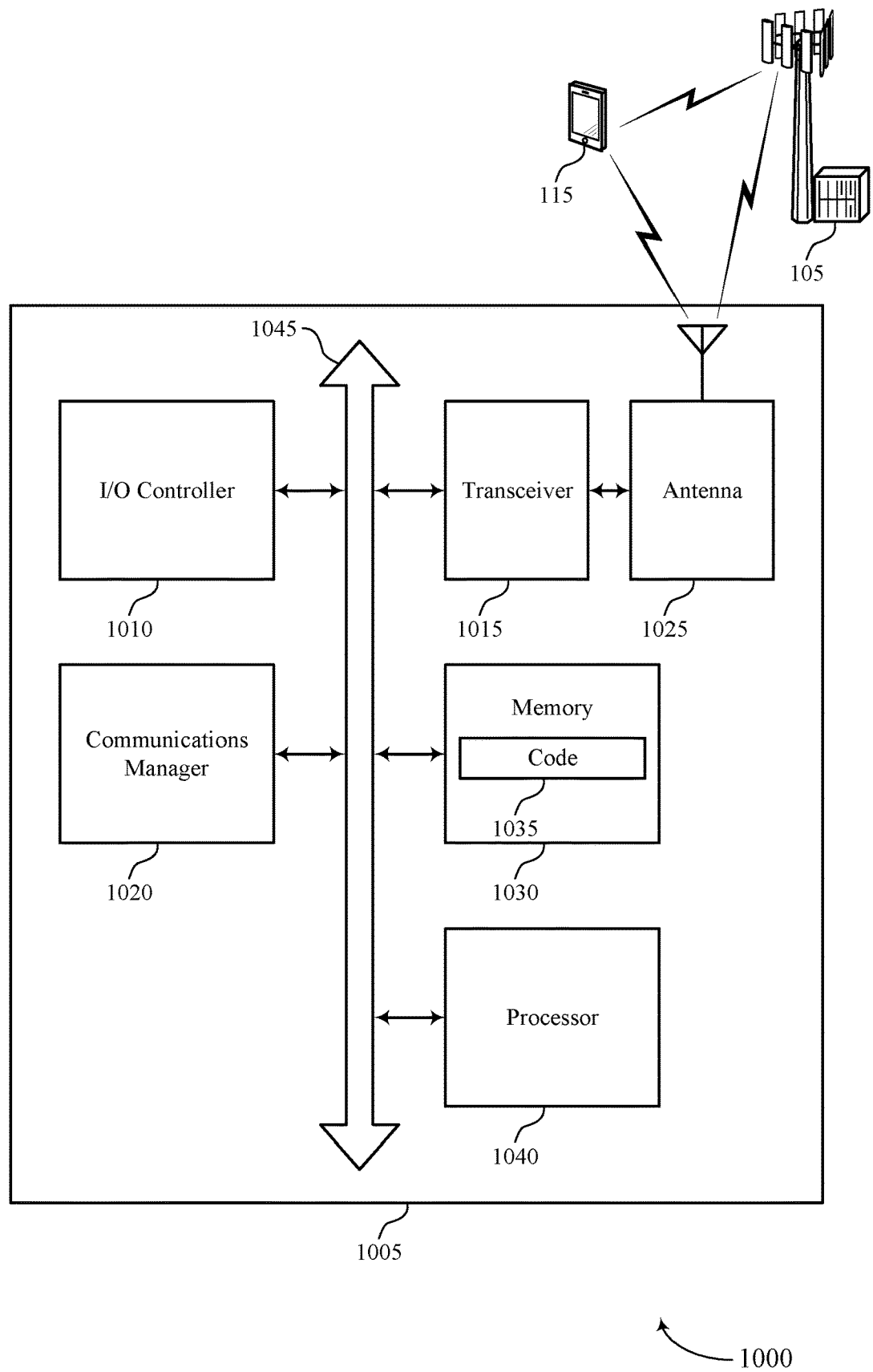
FIG. 10 shows a diagram of a system including a device that supports adaptive UE-specific TRSs for sub-THz systems in accordance with aspects of the present disclosure.

FIG. 10 shows a diagram of a system 1000 including a device 1005 that supports adaptive UE-specific TRSs for sub-THz systems in accordance with aspects of the present disclosure. The device 1005 may be an example of or include the components of a device 705, a device 805, or a UE 115 as described herein. The device 1005 may communicate wirelessly with one or more network entities 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting adaptive UE-specific TRSs for sub-THz systems). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving a message indicating a first set of configuration parameters for TRSs that are specific to the UE. The communications manager 1020 may be configured as or otherwise support a means for monitoring, during a first time interval, for one or more TRSs according to the first set of configuration parameters based on the message. The communications manager 1020 may be configured as or otherwise support a means for receiving an L1 signal or an L2 signal indicating a second set of configuration parameters for TRSs that are specific to the UE, where the second set of configuration parameters is different from the first set of configuration parameters. The communications manager 1020 may be configured as or otherwise support a means for monitoring, during a second time interval subsequent the first time interval, for one or more additional TRSs according to the second set of configuration parameters based on receiving the L1 signal or the L2 signal.

By including or configuring the communications manager 1020 in accordance with examples as described herein, the device 1005 may support techniques for adapting and dynamically reconfiguring configuration parameters for UE-specific TRSs in sub-THz systems, which may decrease signaling overhead and power consumption. In addition, the described techniques may improve coverage of UE-specific TRSs and enable the optimization of UE-specific TRSs for particular UEs.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of adaptive UE-specific TRSs for sub-THz systems as described herein, or the processor 1040 and the memory 1030 may be otherwise configured to perform or support such operations.

Figure 11:
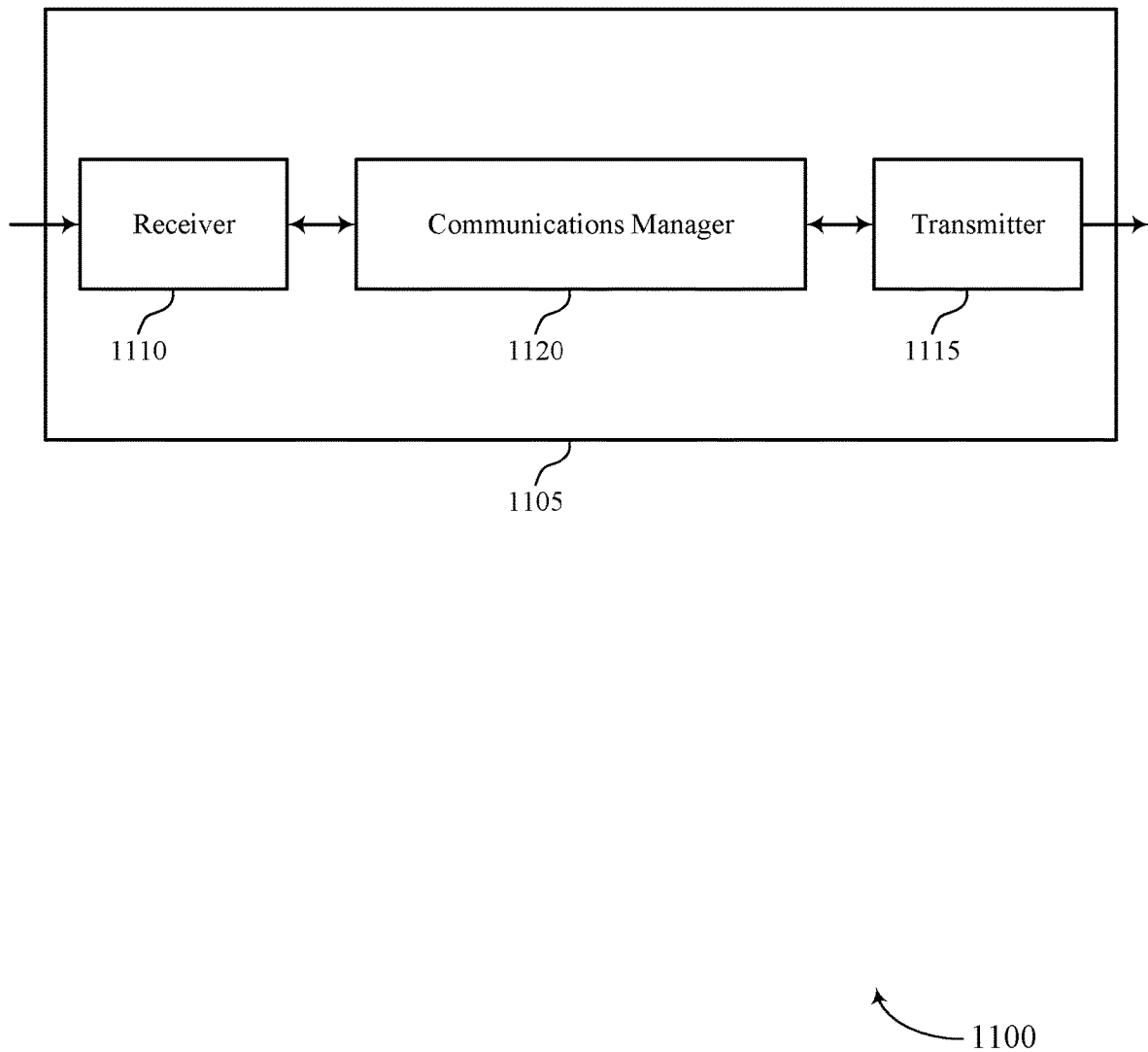
FIGS. 11 and 12 show block diagrams of devices that support adaptive UE-specific TRSs for sub-THz systems in accordance with aspects of the present disclosure.

FIG. 11 shows a block diagram 1100 of a device 1105 that supports adaptive UE-specific TRSs for sub-THz systems in accordance with aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to adaptive UE-specific TRSs for sub-THz systems). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to adaptive UE-specific TRSs for sub-THz systems). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of adaptive UE-specific TRSs for sub-THz systems as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a network entity in accordance with examples as disclosed herein. For example, the communications manager 1120 may be configured as or otherwise support a means for transmitting a message indicating a first set of configuration parameters for TRSs that are specific to a UE. The communications manager 1120 may be configured as or otherwise support a means for transmitting, during a first time interval, one or more TRSs according to the first set of configuration parameters based on transmitting the message. The communications manager 1120 may be configured as or otherwise support a means for transmitting an L1 signal or an L2 signal indicating a second set of configuration parameters for TRSs that are specific to the UE, where the second set of configuration parameters is different from the first set of configuration parameters. The communications manager 1120 may be configured as or otherwise support a means for transmitting, during a second time interval subsequent the first time interval, one or more additional TRSs according to the second set of configuration parameters based on transmitting the L1 signal or the L2 signal.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for adapting and dynamically reconfiguring configuration parameters for UE-specific TRSs in sub-THz systems, which may decrease signaling overhead and power consumption. In addition, the described techniques may improve coverage of UE-specific TRSs and enable the optimization of UE-specific TRSs for particular UEs.

Figure 12:
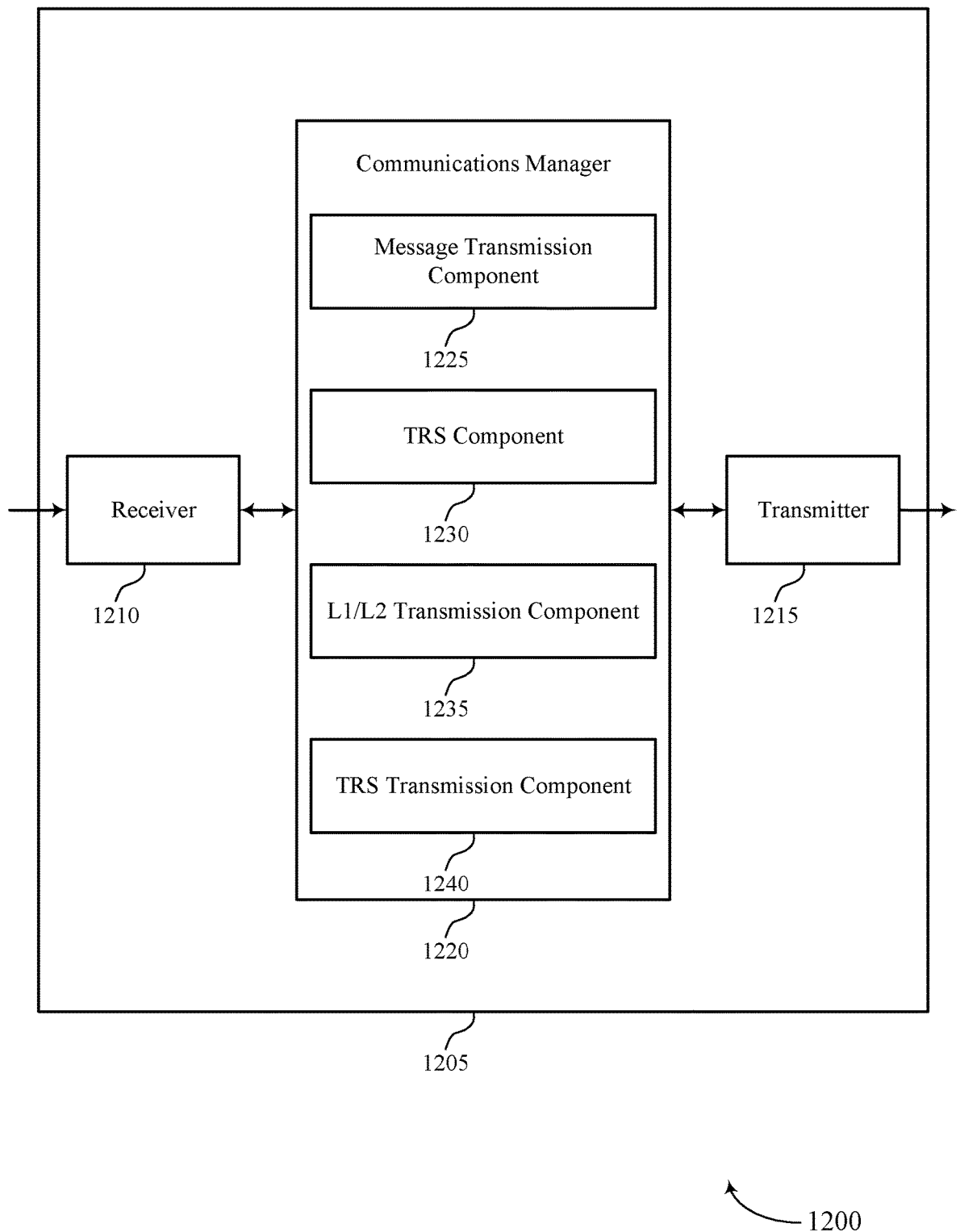

FIG. 12 shows a block diagram 1200 of a device 1205 that supports adaptive UE-specific TRSs for sub-THz systems in accordance with aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to adaptive UE-specific TRSs for sub-THz systems). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to adaptive UE-specific TRSs for sub-THz systems). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of adaptive UE-specific TRSs for sub-THz systems as described herein. For example, the communications manager 1220 may include a message transmission component 1225, an TRS component 1230, a L1/L2 transmission component 1235, an TRS transmission component 1240, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a network entity in accordance with examples as disclosed herein. The message transmission component 1225 may be configured as or otherwise support a means for transmitting a message indicating a first set of configuration parameters for TRSs that are specific to a UE. The TRS component 1230 may be configured as or otherwise support a means for transmitting, during a first time interval, one or more TRSs according to the first set of configuration parameters based on transmitting the message. The L1/L2 transmission component 1235 may be configured as or otherwise support a means for transmitting an L1 signal or an L2 signal indicating a second set of configuration parameters for TRSs that are specific to the UE, where the second set of configuration parameters is different from the first set of configuration parameters. The TRS transmission component 1240 may be configured as or otherwise support a means for transmitting, during a second time interval subsequent the first time interval, one or more additional TRSs according to the second set of configuration parameters based on transmitting the L1 signal or the L2 signal.

Figure 13:
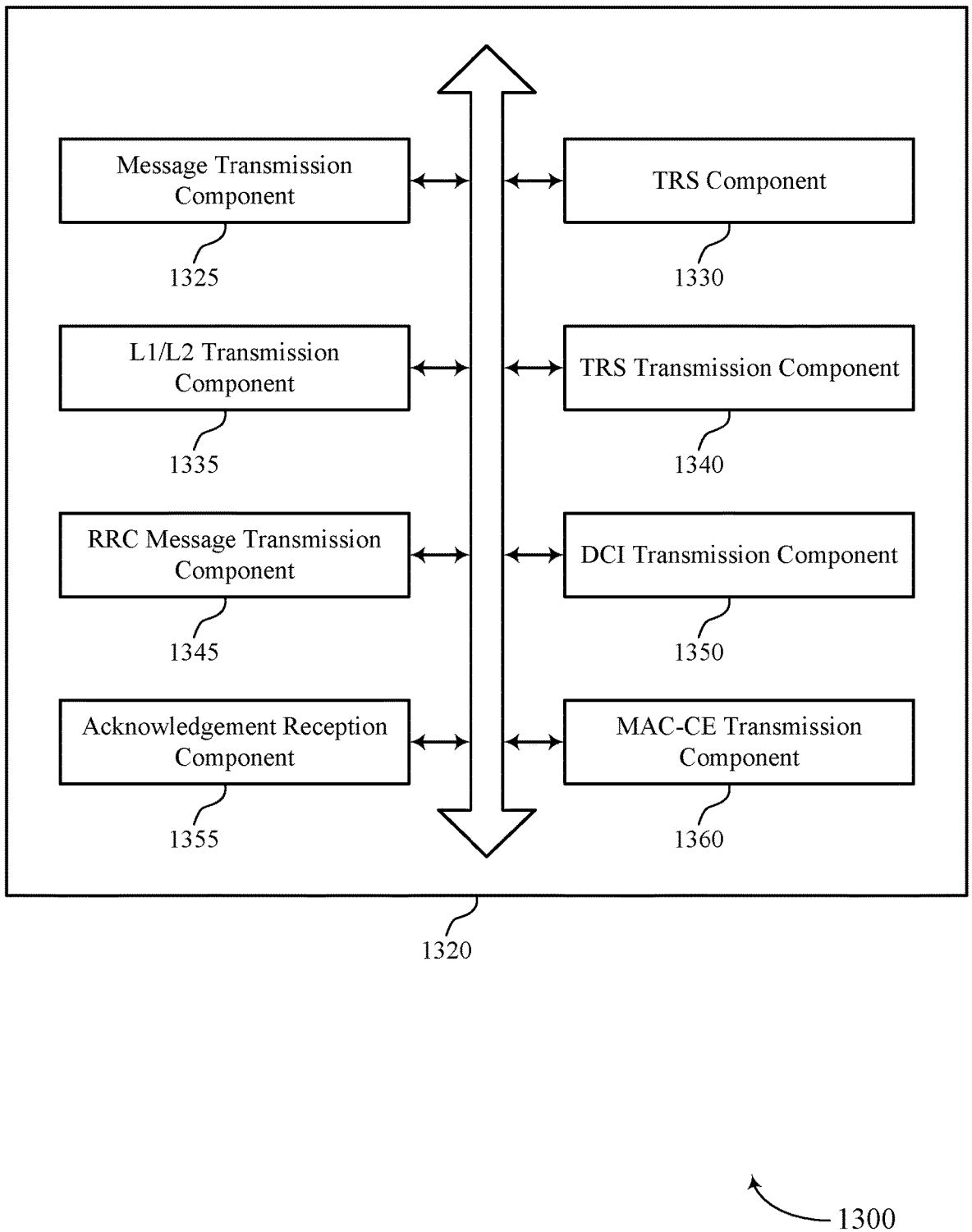
FIG. 13 shows a block diagram of a communications manager that supports adaptive UE-specific TRSs for sub-THz systems in accordance with aspects of the present disclosure.

FIG. 13 shows a block diagram 1300 of a communications manager 1320 that supports adaptive UE-specific TRSs for sub-THz systems in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of adaptive UE-specific TRSs for sub-THz systems as described herein. For example, the communications manager 1320 may include a message transmission component 1325, an TRS component 1330, a L1/L2 transmission component 1335, an TRS transmission component 1340, an RRC message transmission component 1345, a DCI transmission component 1350, an acknowledgement reception component 1355, a MAC-CE transmission component 1360, or any combination thereof. Each of these components may communicate, directly or indirectly, with one another (e.g., via one or more buses).

The communications manager 1320 may support wireless communications at a network entity in accordance with examples as disclosed herein. The message transmission component 1325 may be configured as or otherwise support a means for transmitting a message indicating a first set of configuration parameters for TRSs that are specific to a UE. The TRS component 1330 may be configured as or otherwise support a means for transmitting, during a first time interval, one or more TRSs according to the first set of configuration parameters based on transmitting the message. The L1/L2 transmission component 1335 may be configured as or otherwise support a means for transmitting an L1 signal or an L2 signal indicating a second set of configuration parameters for TRSs that are specific to the UE, where the second set of configuration parameters is different from the first set of configuration parameters. The TRS transmission component 1340 may be configured as or otherwise support a means for transmitting, during a second time interval subsequent the first time interval, one or more additional TRSs according to the second set of configuration parameters based on transmitting the L1 signal or the L2 signal.

In some examples, to support transmitting the L1 signal or the L2 signal indicating the second set of configuration parameters, the L1/L2 transmission component 1335 may be configured as or otherwise support a means for transmitting a MAC-CE indicating the second set of configuration parameters, where the TRSs include semi-persistent TRSs.

In some examples, the MAC-CE transmission component 1360 may be configured as or otherwise support a means for transmitting the MAC-CE indicating the second set of configuration parameters, where the MAC-CE includes a bitmap that indicates a subset of configuration parameters of the second set of configuration parameters. In some examples, the TRS transmission component 1340 may be configured as or otherwise support a means for transmitting, during the second time interval, the one or more additional TRSs according to the subset of configuration parameters based on transmitting the MAC-CE.

In some examples, the RRC message transmission component 1345 may be configured as or otherwise support a means for transmitting an RRC message indicating a set of multiple sets of configuration parameters for TRSs that are specific to the UE that includes the second set of configuration parameters, where the TRSs include periodic or semi-persistent TRSs. In some examples, the L1L2 transmission component 1335 may be configured as or otherwise support a means for transmitting the L1 signal or the L2 signal indicating the second set of configuration parameters, where the L1 signal or the L2 signal includes a MAC-CE.

In some examples, to support transmitting the L1 signal or the L2 signal indicating the second set of configuration parameters, the DCI transmission component 1350 may be configured as or otherwise support a means for transmitting DCI indicating the second set of configuration parameters, where the TRSs include periodic or semi-persistent TRSs.

In some examples, the RRC message transmission component 1345 may be configured as or otherwise support a means for transmitting an RRC message indicating a table including the second set of configuration parameters. In some examples, the DCI transmission component 1350 may be configured as or otherwise support a means for transmitting the DCI indicating the second set of configuration parameters based on transmitting the RRC message.

In some examples, the acknowledgement reception component 1355 may be configured as or otherwise support a means for receiving an acknowledgement message based on transmitting the L1 signal or the L2 signal.

In some examples, the first set of configuration parameters and the second set of configuration parameters include at least one of a dynamic activation for semi-persistent TRSs, a dynamic deactivation for semi-persistent TRSs, a periodicity, a density in a frequency domain, a power boost, a bandwidth, a location within a BWP, a quantity of symbols, a time gap, or any combination thereof. In some examples, each configuration parameter of the first set of configuration parameters and each configuration parameter of the second set of configuration parameters corresponds to a resource set identifier.

In some examples, to support transmitting the one or more TRSs, the TRS component 1330 may be configured as or otherwise support a means for transmitting one or more periodic TRSs, one or more semi-persistent TRSs, one or more aperiodic TRSs, or any combination thereof. In some examples, the UE operates in a sub-THz band.

Figure 14:
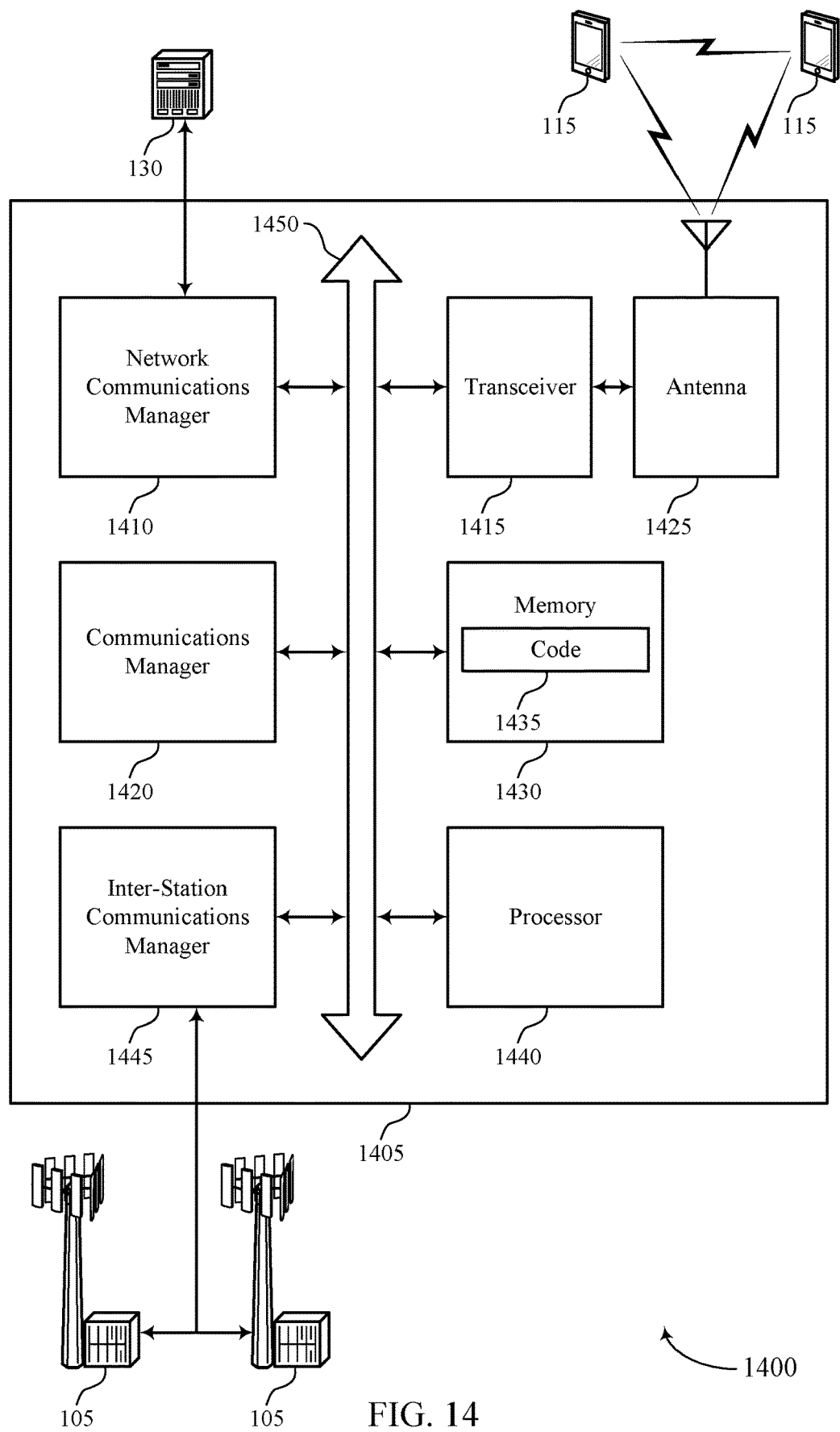
FIG. 14 shows a diagram of a system including a device that supports adaptive UE-specific TRSs for sub-THz systems in accordance with aspects of the present disclosure.

FIG. 14 shows a diagram of a system 1400 including a device 1405 that supports adaptive UE-specific TRSs for sub-THz systems in accordance with aspects of the present disclosure. The device 1405 may be an example of or include the components of a device 1105, a device 1205, or a network entity 105 as described herein. The device 1405 may communicate wirelessly with one or more network entities 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting adaptive UE-specific TRSs for sub-THz systems). For example, the device 1405 or a component of the device 1405 may include a processor 1440 and memory 1430 coupled with or to the processor 1440, the processor 1440 and memory 1430 configured to perform various functions described herein.

The inter-station communications manager 1445 may manage communications with other network entities 105, and may include a controller or scheduler for controlling communications with UEs 115 in cooperation with other network entities 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between network entities 105.

The communications manager 1420 may support wireless communications at a network entity in accordance with examples as disclosed herein. For example, the communications manager 1420 may be configured as or otherwise support a means for transmitting a message indicating a first set of configuration parameters for TRSs that are specific to a UE. The communications manager 1420 may be configured as or otherwise support a means for transmitting, during a first time interval, one or more TRSs according to the first set of configuration parameters based on transmitting the message. The communications manager 1420 may be configured as or otherwise support a means for transmitting an L1 signal or an L2 signal indicating a second set of configuration parameters for TRSs that are specific to the UE, where the second set of configuration parameters is different from the first set of configuration parameters. The communications manager 1420 may be configured as or otherwise support a means for transmitting, during a second time interval subsequent the first time interval, one or more additional TRSs according to the second set of configuration parameters based on transmitting the L1 signal or the L2 signal.

By including or configuring the communications manager 1420 in accordance with examples as described herein, the device 1405 may support techniques for adapting and dynamically reconfiguring configuration parameters for UE-specific TRSs in sub-THz systems, which may decrease signaling overhead and power consumption. In addition, the described techniques may improve coverage of UE-specific TRSs and enable the optimization of UE-specific TRSs for particular UEs.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of adaptive UE-specific TRSs for sub-THz systems as described herein, or the processor 1440 and the memory 1430 may be otherwise configured to perform or support such operations.

Figure 15:
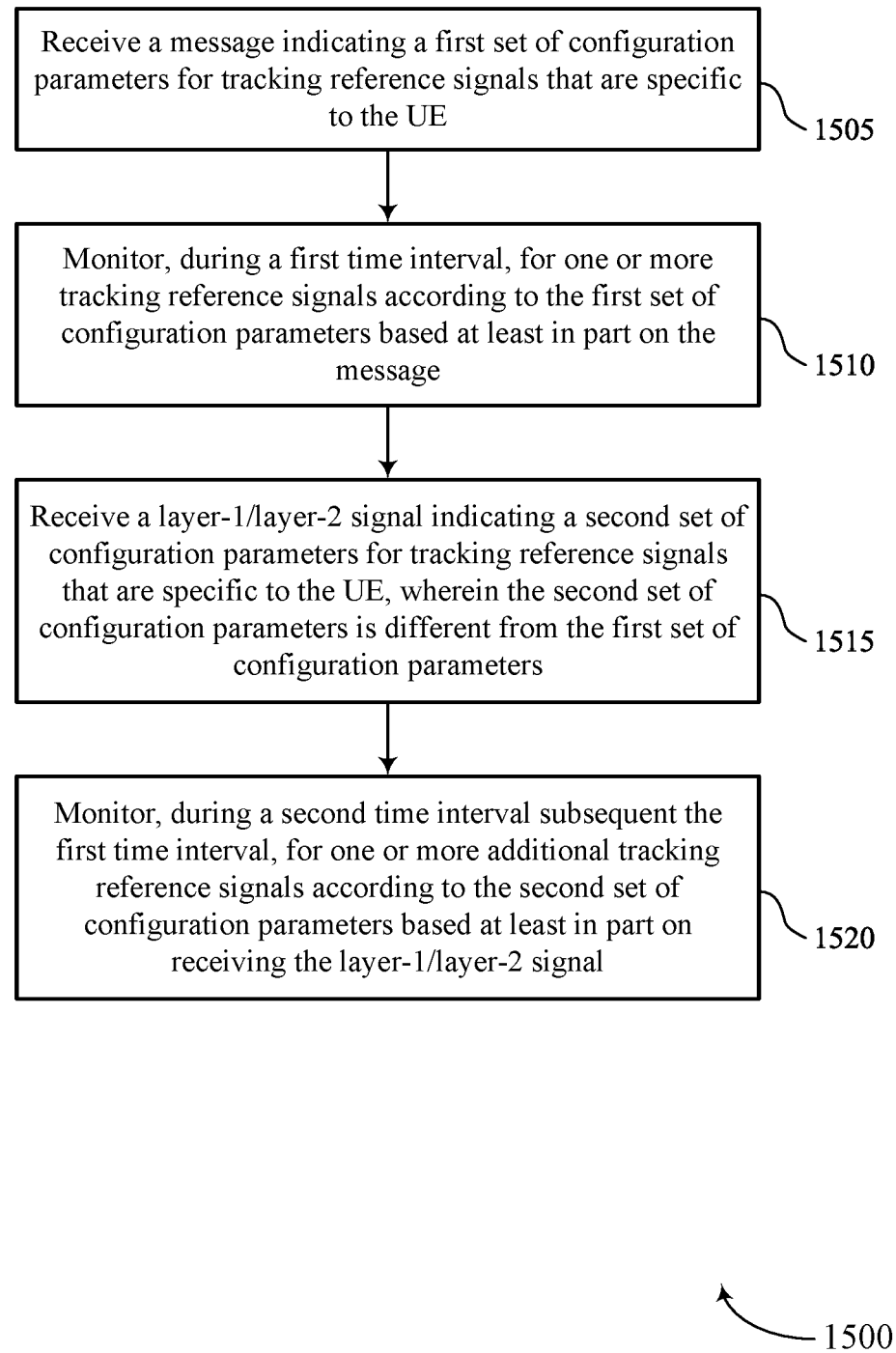
FIGS. 15 through 22 show flowcharts illustrating methods that support adaptive UE-specific TRSs for sub-THz systems in accordance with aspects of the present disclosure.

FIG. 15 shows a flowchart illustrating a method 1500 that supports adaptive UE-specific TRSs for sub-THz systems in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving a message indicating a first set of configuration parameters for TRSs that are specific to the UE. The operations of 1505 may be performed in accordance with examples as disclosed herein. In some examples, aspects of the operations of 1505 may be performed by a message reception component 925 as described with reference to FIG. 9.

At 1510, the method may include monitoring, during a first time interval, for one or more TRSs according to the first set of configuration parameters based on the message. The operations of 1510 may be performed in accordance with examples as disclosed herein. In some examples, aspects of the operations of 1510 may be performed by an TRS monitoring component 930 as described with reference to FIG. 9.

At 1515, the method may include receiving an L1 signal or an L2 signal indicating a second set of configuration parameters for TRSs that are specific to the UE, where the second set of configuration parameters is different from the first set of configuration parameters. The operations of 1515 may be performed in accordance with examples as disclosed herein. In some examples, aspects of the operations of 1515 may be performed by a L1/L2 reception component 935 as described with reference to FIG. 9.

At 1520, the method may include monitoring, during a second time interval subsequent the first time interval, for one or more additional TRSs according to the second set of configuration parameters based on receiving the L1 signal or the L2 signal. The operations of 1520 may be performed in accordance with examples as disclosed herein. In some examples, aspects of the operations of 1520 may be performed by a monitoring component 940 as described with reference to FIG. 9.

Figure 16:
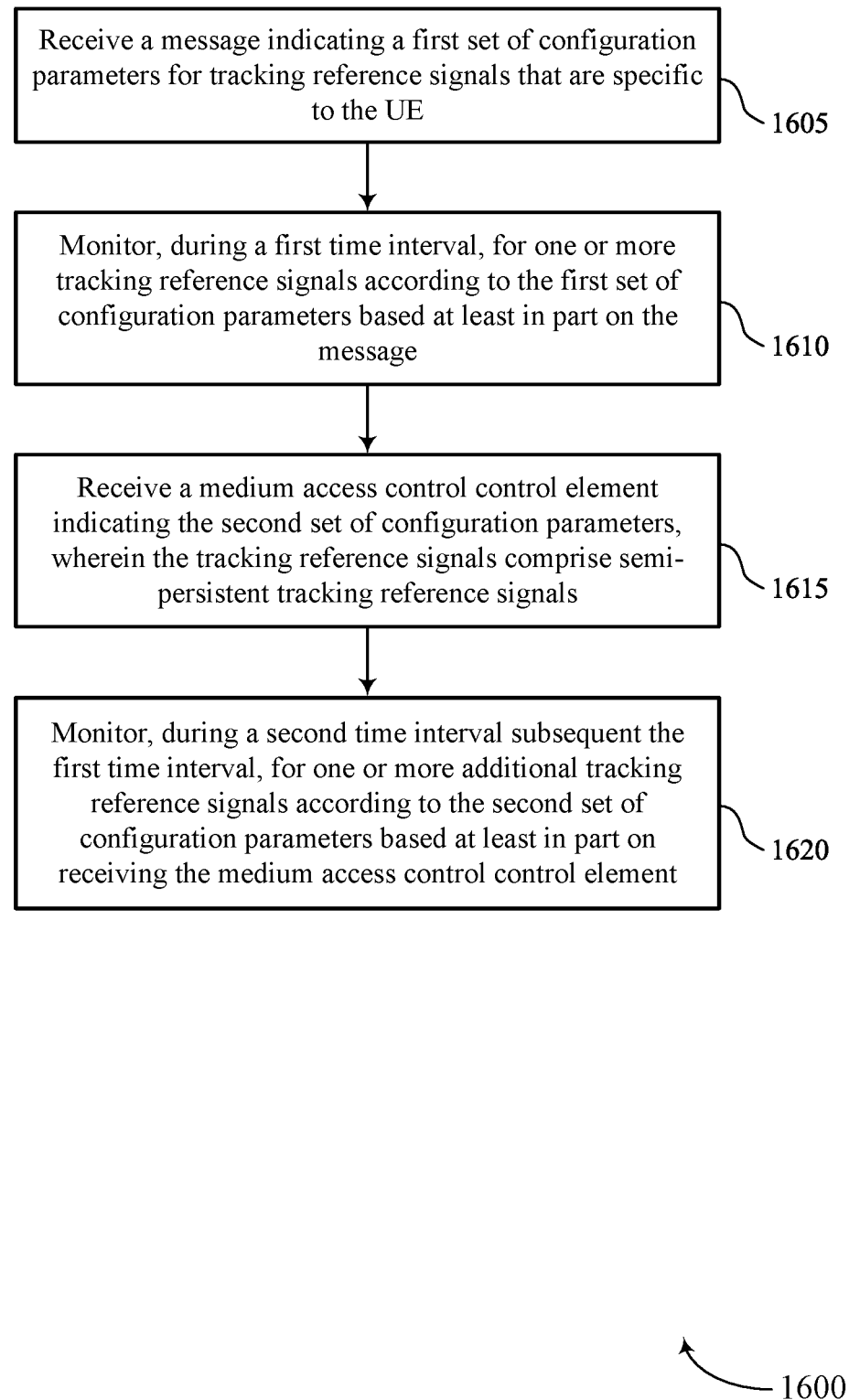

FIG. 16 shows a flowchart illustrating a method 1600 that supports adaptive UE-specific TRSs for sub-THz systems in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving a message indicating a first set of configuration parameters for TRSs that are specific to the UE. The operations of 1605 may be performed in accordance with examples as disclosed herein. In some examples, aspects of the operations of 1605 may be performed by a message reception component 925 as described with reference to FIG. 9.

At 1610, the method may include monitoring, during a first time interval, for one or more TRSs according to the first set of configuration parameters based on the message. The operations of 1610 may be performed in accordance with examples as disclosed herein. In some examples, aspects of the operations of 1610 may be performed by an TRS monitoring component 930 as described with reference to FIG. 9.

At 1615, the method may include receiving a MAC-CE indicating the second set of configuration parameters, where the TRSs include semi-persistent TRSs. The operations of 1615 may be performed in accordance with examples as disclosed herein. In some examples, aspects of the operations of 1615 may be performed by a MAC-CE reception component 945 as described with reference to FIG. 9.

At 1620, the method may include monitoring, during a second time interval subsequent the first time interval, for one or more additional TRSs according to the second set of configuration parameters based on receiving the MAC-CE. The operations of 1620 may be performed in accordance with examples as disclosed herein. In some examples, aspects of the operations of 1620 may be performed by a monitoring component 940 as described with reference to FIG. 9.

Figure 17:
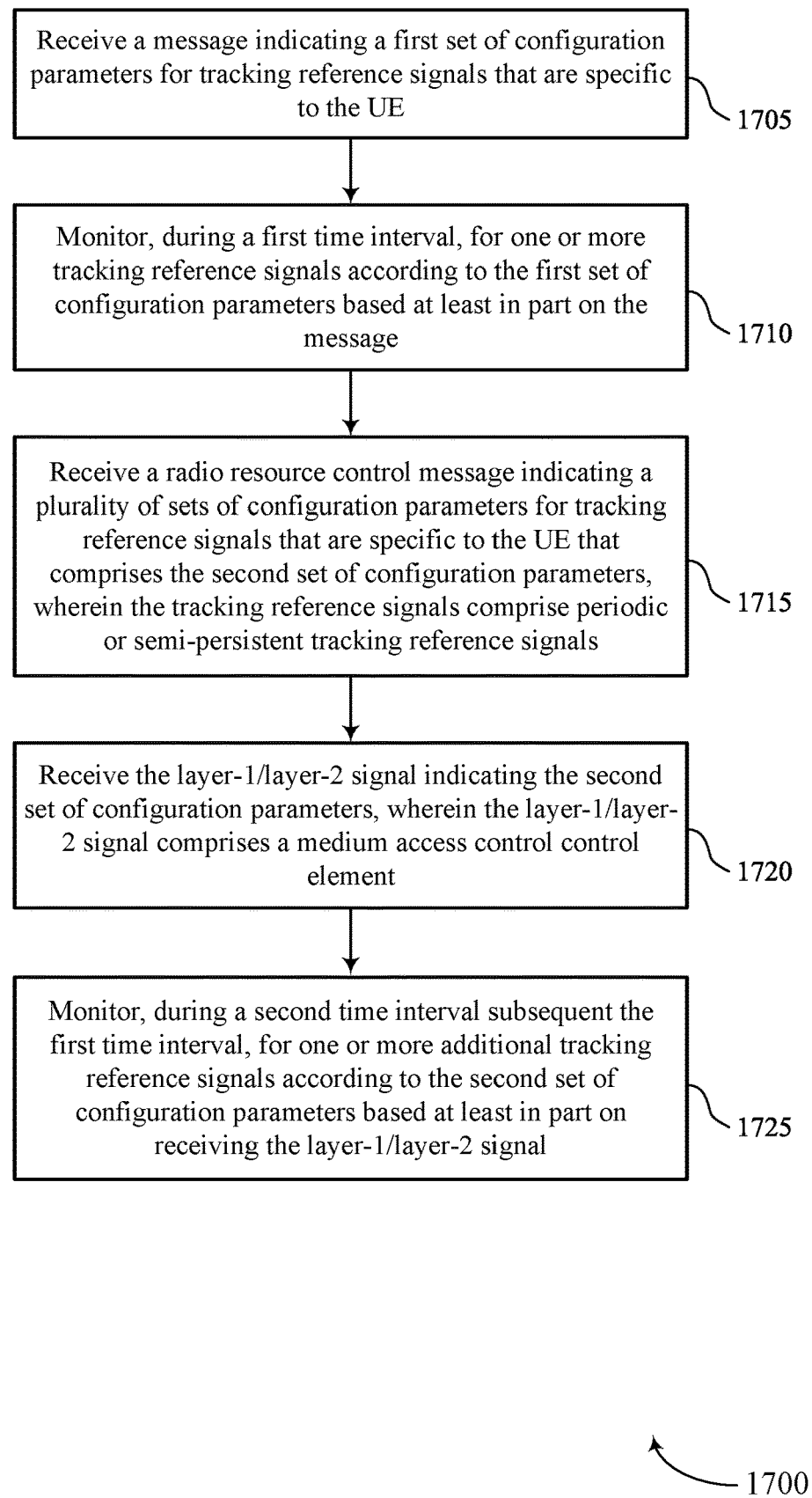

FIG. 17 shows a flowchart illustrating a method 1700 that supports adaptive UE-specific TRSs for sub-THz systems in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving a message indicating a first set of configuration parameters for TRSs that are specific to the UE. The operations of 1705 may be performed in accordance with examples as disclosed herein. In some examples, aspects of the operations of 1705 may be performed by a message reception component 925 as described with reference to FIG. 9.

At 1710, the method may include monitoring, during a first time interval, for one or more TRSs according to the first set of configuration parameters based on the message. The operations of 1710 may be performed in accordance with examples as disclosed herein. In some examples, aspects of the operations of 1710 may be performed by an TRS monitoring component 930 as described with reference to FIG. 9.

At 1715, the method may include receiving an RRC message indicating a set of multiple sets of configuration parameters for TRSs that are specific to the UE that includes the second set of configuration parameters, where the TRSs include periodic or semi-persistent TRSs. The operations of 1715 may be performed in accordance with examples as disclosed herein. In some examples, aspects of the operations of 1715 may be performed by an RRC message reception component 950 as described with reference to FIG. 9.

At 1720, the method may include receiving the L1 signal or the L2 signal indicating the second set of configuration parameters, where the L1 signal or the L2 signal includes a MAC-CE. The operations of 1720 may be performed in accordance with examples as disclosed herein. In some examples, aspects of the operations of 1720 may be performed by a signal reception component 955 as described with reference to FIG. 9.

At 1725, the method may include monitoring, during a second time interval subsequent the first time interval, for one or more additional TRSs according to the second set of configuration parameters based on receiving the L1 signal or the L2 signal. The operations of 1725 may be performed in accordance with examples as disclosed herein. In some examples, aspects of the operations of 1725 may be performed by a monitoring component 940 as described with reference to FIG. 9.

Figure 18:
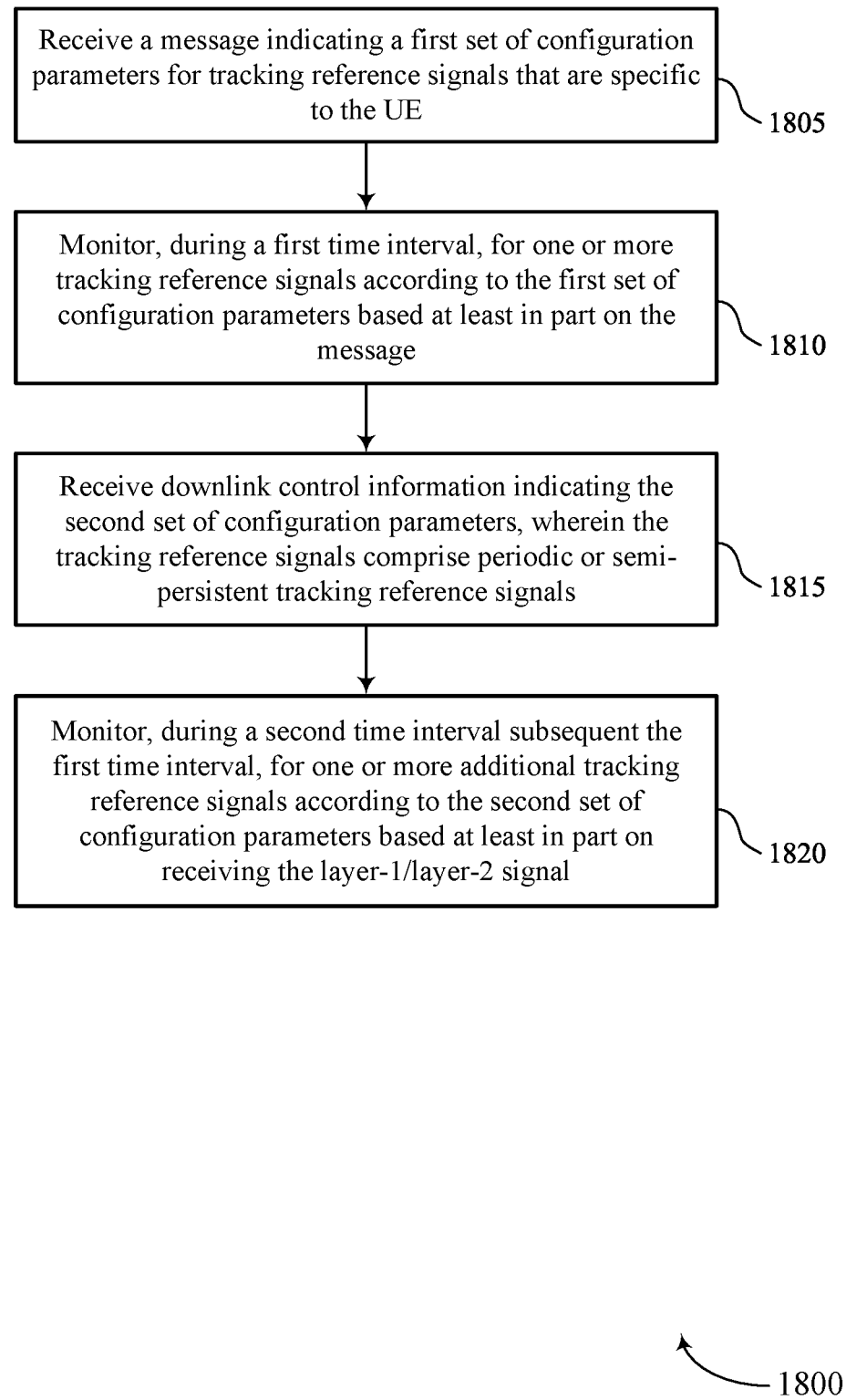

FIG. 18 shows a flowchart illustrating a method 1800 that supports adaptive UE-specific TRSs for sub-THz systems in accordance with aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1805, the method may include receiving a message indicating a first set of configuration parameters for TRSs that are specific to the UE. The operations of 1805 may be performed in accordance with examples as disclosed herein. In some examples, aspects of the operations of 1805 may be performed by a message reception component 925 as described with reference to FIG. 9.

At 1810, the method may include monitoring, during a first time interval, for one or more TRSs according to the first set of configuration parameters based on the message. The operations of 1810 may be performed in accordance with examples as disclosed herein. In some examples, aspects of the operations of 1810 may be performed by an TRS monitoring component 930 as described with reference to FIG. 9.

At 1815, the method may include receiving DCI indicating the second set of configuration parameters, where the TRSs include periodic or semi-persistent TRSs. The operations of 1815 may be performed in accordance with examples as disclosed herein. In some examples, aspects of the operations of 1815 may be performed by a DCI reception component 960 as described with reference to FIG. 9.

At 1820, the method may include monitoring, during a second time interval subsequent the first time interval, for one or more additional TRSs according to the second set of configuration parameters based on receiving the L1 signal or the L2 signal. The operations of 1820 may be performed in accordance with examples as disclosed herein. In some examples, aspects of the operations of 1820 may be performed by a monitoring component 940 as described with reference to FIG. 9.

Figure 19:
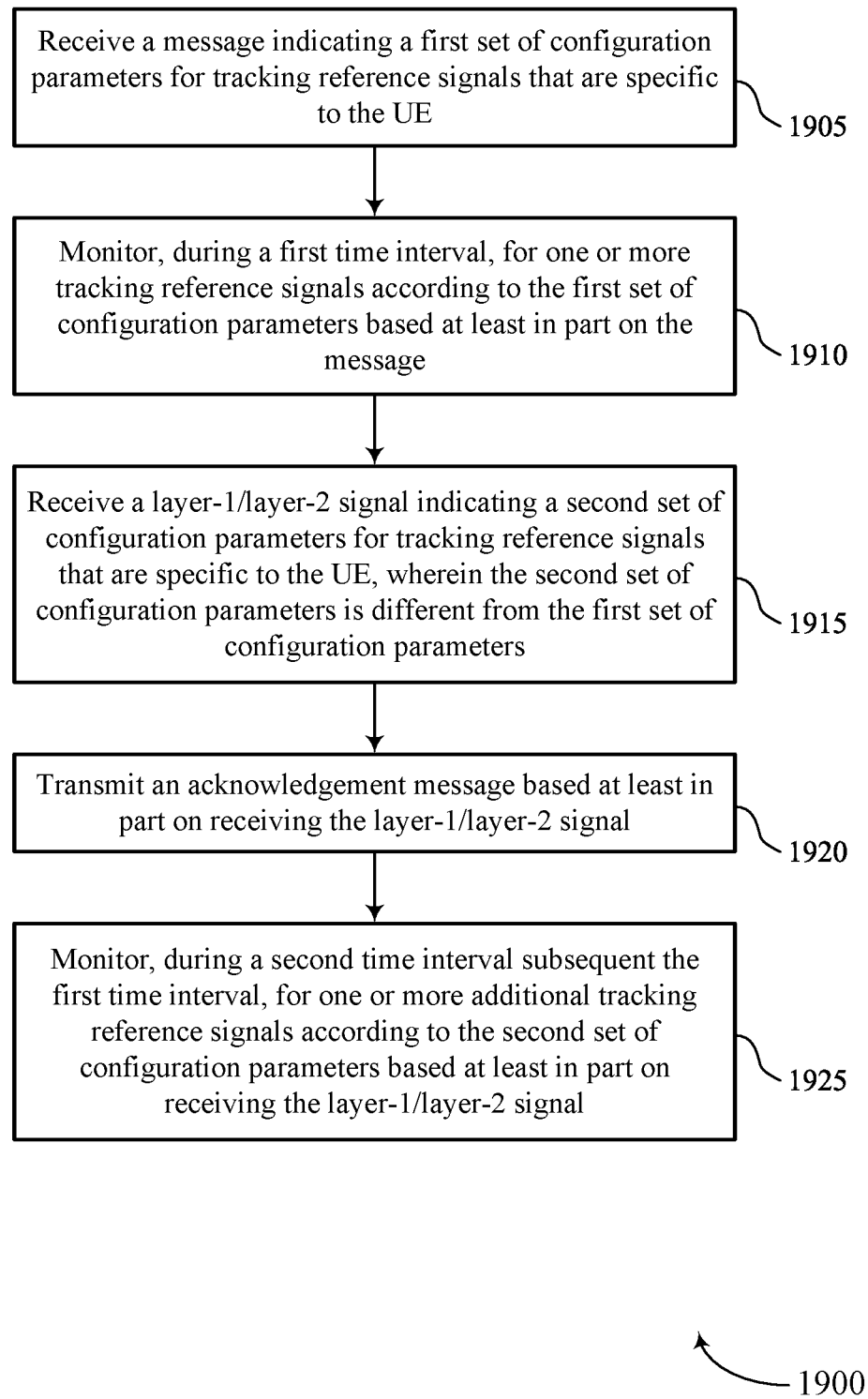

FIG. 19 shows a flowchart illustrating a method 1900 that supports adaptive UE-specific TRSs for sub-THz systems in accordance with aspects of the present disclosure. The operations of the method 1900 may be implemented by a UE or its components as described herein. For example, the operations of the method 1900 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1905, the method may include receiving a message indicating a first set of configuration parameters for TRSs that are specific to the UE. The operations of 1905 may be performed in accordance with examples as disclosed herein. In some examples, aspects of the operations of 1905 may be performed by a message reception component 925 as described with reference to FIG. 9.

At 1910, the method may include monitoring, during a first time interval, for one or more TRSs according to the first set of configuration parameters based on the message. The operations of 1910 may be performed in accordance with examples as disclosed herein. In some examples, aspects of the operations of 1910 may be performed by an TRS monitoring component 930 as described with reference to FIG. 9.

At 1915, the method may include receiving an L1 signal or an L2 signal indicating a second set of configuration parameters for TRSs that are specific to the UE, where the second set of configuration parameters is different from the first set of configuration parameters. The operations of 1915 may be performed in accordance with examples as disclosed herein. In some examples, aspects of the operations of 1915 may be performed by a L1/L2 reception component 935 as described with reference to FIG. 9.

At 1920, the method may include transmitting an acknowledgement message based on receiving the L1 signal or the L2 signal. The operations of 1920 may be performed in accordance with examples as disclosed herein. In some examples, aspects of the operations of 1920 may be performed by an acknowledgement transmission component 965 as described with reference to FIG. 9.

At 1925, the method may include monitoring, during a second time interval subsequent the first time interval, for one or more additional TRSs according to the second set of configuration parameters based on receiving the L1 signal or the L2 signal. The operations of 1925 may be performed in accordance with examples as disclosed herein. In some examples, aspects of the operations of 1925 may be performed by a monitoring component 940 as described with reference to FIG. 9.

Figure 20:
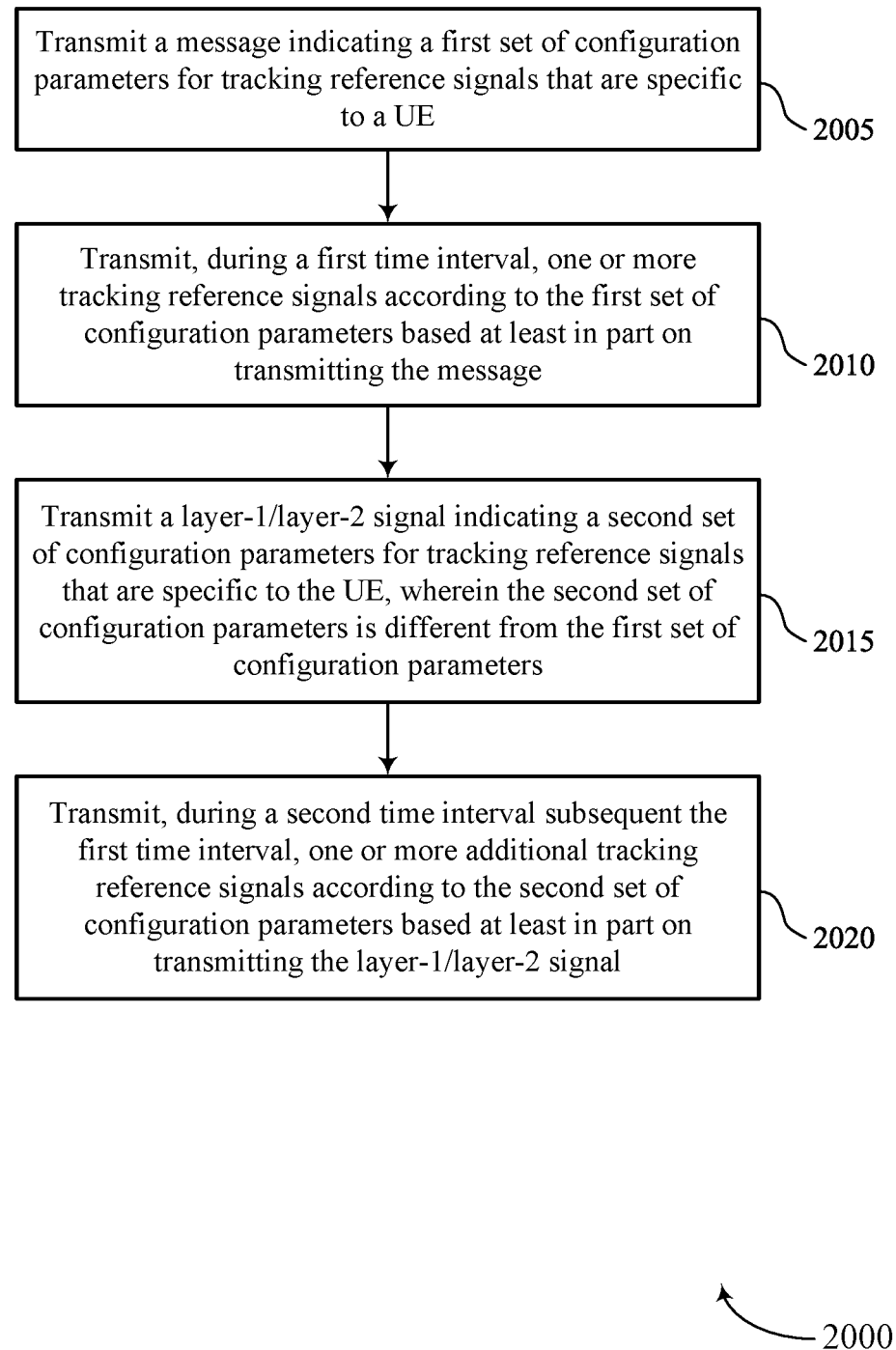

FIG. 20 shows a flowchart illustrating a method 2000 that supports adaptive UE-specific TRSs for sub-THz systems in accordance with aspects of the present disclosure. The operations of the method 2000 may be implemented by a network entity or its components as described herein. For example, the operations of the method 2000 may be performed by a network entity 105 as described with reference to FIGS. 1 through 6 and 11 through 14. In some examples, a network entity may execute a set of instructions to control the functional elements of the network entity to perform the described functions. Additionally or alternatively, the network entity may perform aspects of the described functions using special-purpose hardware.

At 2005, the method may include transmitting a message indicating a first set of configuration parameters for TRSs that are specific to a UE. The operations of 2005 may be performed in accordance with examples as disclosed herein. In some examples, aspects of the operations of 2005 may be performed by a message transmission component 1325 as described with reference to FIG. 13.

At 2010, the method may include transmitting, during a first time interval, one or more TRSs according to the first set of configuration parameters based on transmitting the message. The operations of 2010 may be performed in accordance with examples as disclosed herein. In some examples, aspects of the operations of 2010 may be performed by an TRS component 1330 as described with reference to FIG. 13.

At 2015, the method may include transmitting an L1 signal or an L2 signal indicating a second set of configuration parameters for TRSs that are specific to the UE, where the second set of configuration parameters is different from the first set of configuration parameters. The operations of 2015 may be performed in accordance with examples as disclosed herein. In some examples, aspects of the operations of 2015 may be performed by a L1/L2 transmission component 1335 as described with reference to FIG. 13.

At 2020, the method may include transmitting, during a second time interval subsequent the first time interval, one or more additional TRSs according to the second set of configuration parameters based on transmitting the L1 signal or the L2 signal. The operations of 2020 may be performed in accordance with examples as disclosed herein. In some examples, aspects of the operations of 2020 may be performed by an TRS transmission component 1340 as described with reference to FIG. 13.

Figure 21:
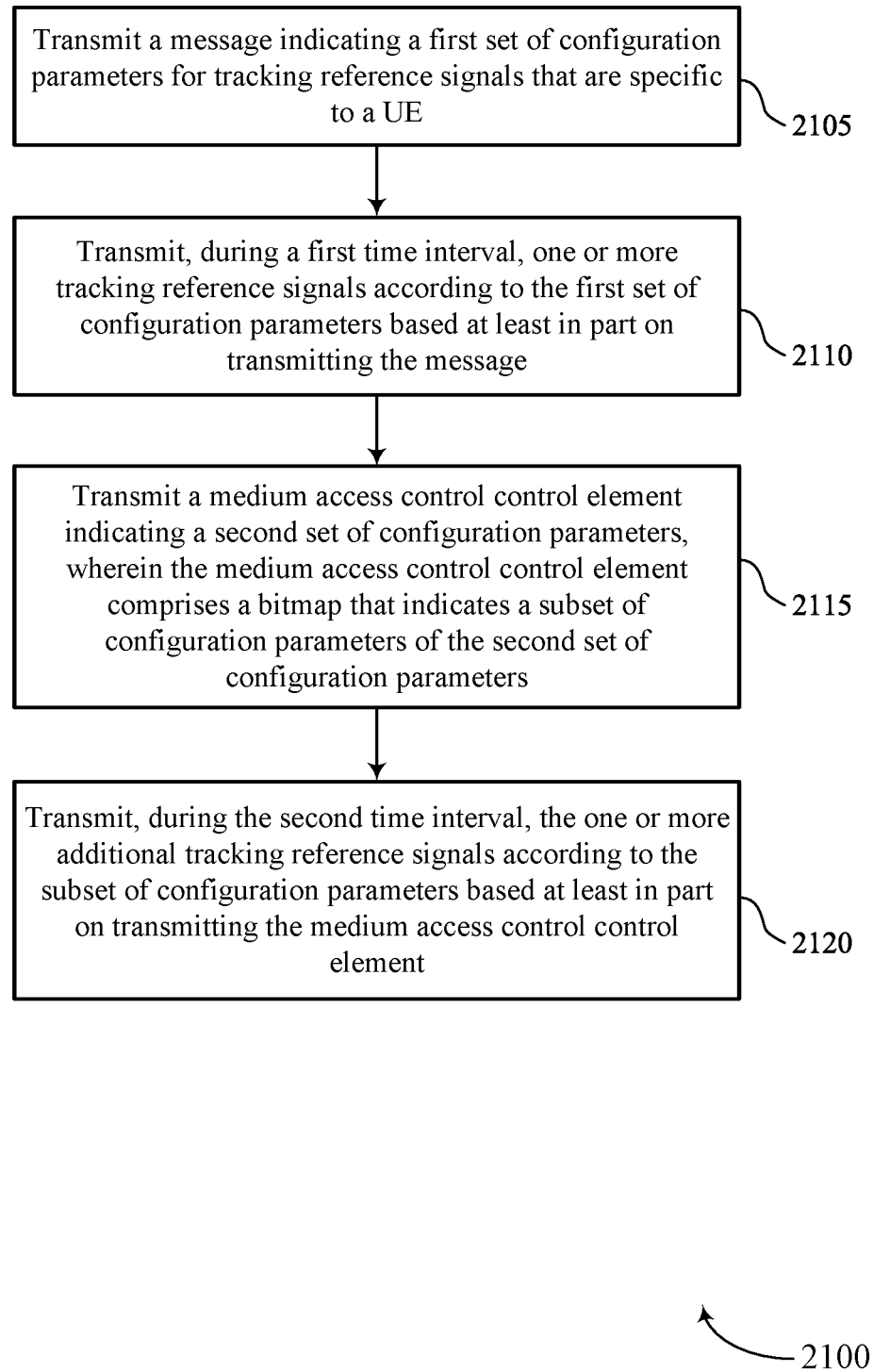

FIG. 21 shows a flowchart illustrating a method 2100 that supports adaptive UE-specific TRSs for sub-THz systems in accordance with aspects of the present disclosure. The operations of the method 2100 may be implemented by a network entity or its components as described herein. For example, the operations of the method 2100 may be performed by a network entity 105 as described with reference to FIGS. 1 through 6 and 11 through 14. In some examples, a network entity may execute a set of instructions to control the functional elements of the network entity to perform the described functions. Additionally or alternatively, the network entity may perform aspects of the described functions using special-purpose hardware.

At 2105, the method may include transmitting a message indicating a first set of configuration parameters for TRSs that are specific to a UE. The operations of 2105 may be performed in accordance with examples as disclosed herein. In some examples, aspects of the operations of 2105 may be performed by a message transmission component 1325 as described with reference to FIG. 13.

At 2110, the method may include transmitting, during a first time interval, one or more TRSs according to the first set of configuration parameters based on transmitting the message. The operations of 2110 may be performed in accordance with examples as disclosed herein. In some examples, aspects of the operations of 2110 may be performed by an TRS component 1330 as described with reference to FIG. 13.

At 2115, the method may include transmitting a MAC-CE indicating a second set of configuration parameters, where the MAC-CE includes a bitmap that indicates a subset of configuration parameters of the second set of configuration parameters. The operations of 2115 may be performed in accordance with examples as disclosed herein. In some examples, aspects of the operations of 2115 may be performed by a MAC-CE transmission component 1360 as described with reference to FIG. 13.

At 2120, the method may include transmitting, during the second time interval, the one or more additional TRSs according to the subset of configuration parameters based on transmitting the MAC-CE. The operations of 2120 may be performed in accordance with examples as disclosed herein. In some examples, aspects of the operations of 2120 may be performed by an TRS transmission component 1340 as described with reference to FIG. 13.

Figure 22:
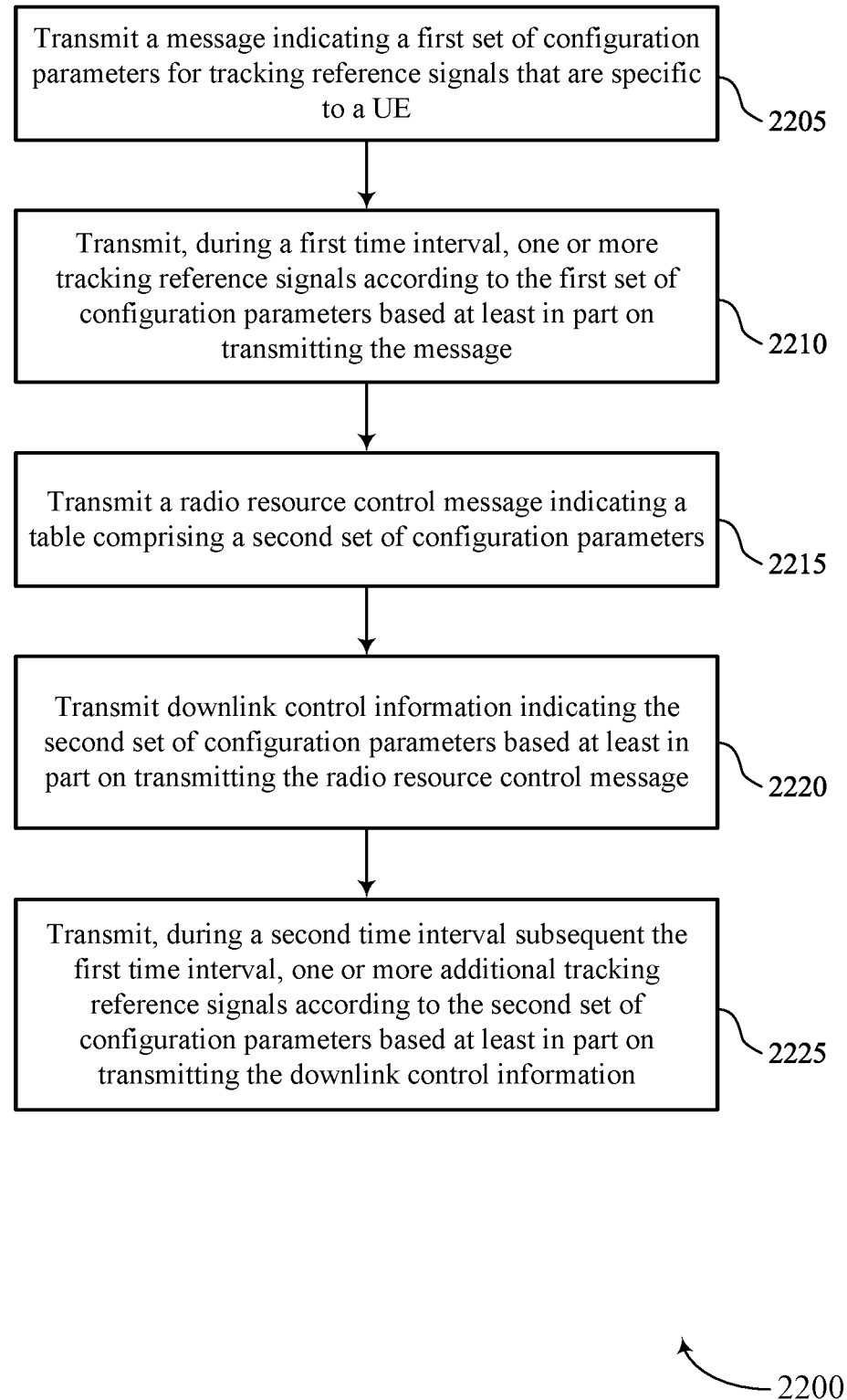

FIG. 22 shows a flowchart illustrating a method 2200 that supports adaptive UE-specific TRSs for sub-THz systems in accordance with aspects of the present disclosure. The operations of the method 2200 may be implemented by a network entity or its components as described herein. For example, the operations of the method 2200 may be performed by a network entity 105 as described with reference to FIGS. 1 through 6 and 11 through 14. In some examples, a network entity may execute a set of instructions to control the functional elements of the network entity to perform the described functions. Additionally or alternatively, the network entity may perform aspects of the described functions using special-purpose hardware.

At 2205, the method may include transmitting a message indicating a first set of configuration parameters for TRSs that are specific to a UE. The operations of 2205 may be performed in accordance with examples as disclosed herein. In some examples, aspects of the operations of 2205 may be performed by a message transmission component 1325 as described with reference to FIG. 13.

At 2210, the method may include transmitting, during a first time interval, one or more TRSs according to the first set of configuration parameters based on transmitting the message. The operations of 2210 may be performed in accordance with examples as disclosed herein. In some examples, aspects of the operations of 2210 may be performed by an TRS component 1330 as described with reference to FIG. 13.

At 2215, the method may include transmitting an RRC message indicating a table including a second set of configuration parameters. The operations of 2215 may be performed in accordance with examples as disclosed herein. In some examples, aspects of the operations of 2215 may be performed by an RRC message transmission component 1345 as described with reference to FIG. 13.

At 2220, the method may include transmitting DCI indicating the second set of configuration parameters based on transmitting the RRC message. The operations of 2220 may be performed in accordance with examples as disclosed herein. In some examples, aspects of the operations of 2220 may be performed by a DCI transmission component 1350 as described with reference to FIG. 13.

At 2225, the method may include transmitting, during a second time interval subsequent the first time interval, one or more additional TRSs according to the second set of configuration parameters based on transmitting the DCI. The operations of 2225 may be performed in accordance with examples as disclosed herein. In some examples, aspects of the operations of 2225 may be performed by an TRS transmission component 1340 as described with reference to FIG. 13.

The following provides an overview of aspects of the present disclosure:

Aspect 1: A method for wireless communications at a UE, comprising: receiving a message indicating a first set of configuration parameters for TRSs that are specific to the UE; monitoring, during a first time interval, for one or more TRSs according to the first set of configuration parameters based at least in part on the message; receiving an L1 signal or an L2 signal indicating a second set of configuration parameters for TRSs that are specific to the UE, wherein the second set of configuration parameters is different from the first set of configuration parameters; and monitoring, during a second time interval subsequent the first time interval, for one or more additional TRSs according to the second set of configuration parameters based at least in part on receiving the L1 signal or the L2 signal.

Aspect 2: The method of aspect 1, wherein receiving the L1 signal or the L2 signal indicating the second set of configuration parameters comprises: receiving a MAC-CE indicating the second set of configuration parameters, wherein the TRSs comprise semi-persistent TRSs.

Aspect 3: The method of aspect 2, further comprising: receiving the MAC-CE indicating the second set of configuration parameters, wherein the MAC-CE comprises a bitmap that indicates a subset of configuration parameters of the second set of configuration parameters; and monitoring, during the second time interval, for the one or more additional TRSs according to the subset of configuration parameters based at least in part on receiving the MAC-CE.

Aspect 4: The method of any of aspects 1 through 3, further comprising: receiving an RRC message indicating a plurality of sets of configuration parameters for TRSs that are specific to the UE that comprises the second set of configuration parameters, wherein the TRSs comprise periodic or semi-persistent TRSs; and receiving the L1 signal or the L2 signal indicating the second set of configuration parameters, wherein the L1 signal or the L2 signal comprises a MAC-CE.

Aspect 5: The method of any of aspects 1 through 4, wherein receiving the L1 signal or the L2 signal indicating the second set of configuration parameters comprises: receiving DCI indicating the second set of configuration parameters, wherein the TRSs comprise periodic or semi-persistent TRSs.

Aspect 6: The method of aspect 5, further comprising: receiving an RRC message indicating a table comprising the second set of configuration parameters; and receiving the DCI indicating the second set of configuration parameters based at least in part on receiving the RRC message.

Aspect 7: The method of any of aspects 1 through 6, further comprising: transmitting an acknowledgement message based at least in part on receiving the L1 signal or the L2 signal.

Aspect 8: The method of any of aspects 1 through 7, wherein the first set of configuration parameters and the second set of configuration parameters comprise at least one of a dynamic activation for semi-persistent TRSs, a dynamic deactivation for semi-persistent TRSs, a periodicity, a density in a frequency domain, a power boost, a bandwidth, a location within a BWP, a quantity of symbols, a time gap, or any combination thereof Aspect 9: The method of any of aspects 1 through 8, wherein each configuration parameter of the first set of configuration parameters and each configuration parameter of the second set of configuration parameters corresponds to a resource set identifier.

Aspect 10: The method of any of aspects 1 through 9, wherein monitoring for the one or more TRSs comprises: monitoring for one or more periodic TRSs, one or more semi-TRSs, one or more aperiodic TRSs, or any combination thereof Aspect 11: The method of any of aspects 1 through 10, wherein the UE operates in a sub-THz band.

Aspect 12: A method for wireless communications at a base station, comprising: transmitting a message indicating a first set of configuration parameters for TRSs that are specific to a UE; transmitting, during a first time interval, one or more TRSs according to the first set of configuration parameters based at least in part on transmitting the message; transmitting an L1 signal or an L2 signal indicating a second set of configuration parameters for TRSs that are specific to the UE, wherein the second set of configuration parameters is different from the first set of configuration parameters; and transmitting, during a second time interval subsequent the first time interval, one or more additional TRSs according to the second set of configuration parameters based at least in part on transmitting the L1 signal or the L2 signal.

Aspect 13: The method of aspect 12, wherein transmitting the L1 signal or the L2 signal indicating the second set of configuration parameters comprises: transmitting a MAC-CE indicating the second set of configuration parameters, wherein the TRSs comprise semi-persistent TRSs.

Aspect 14: The method of aspect 13, further comprising: transmitting the MAC-CE indicating the second set of configuration parameters, wherein the MAC-CE comprises a bitmap that indicates a subset of configuration parameters of the second set of configuration parameters; and transmitting, during the second time interval, the one or more additional TRSs according to the subset of configuration parameters based at least in part on transmitting the MAC-CE.

Aspect 15: The method of any of aspects 12 through 14, further comprising: transmitting an RRC message indicating a plurality of sets of configuration parameters for TRSs that are specific to the UE that comprises the second set of configuration parameters, wherein the TRSs comprise periodic or semi-persistent TRSs; and transmitting the L1 signal or the L2 signal indicating the second set of configuration parameters, wherein the L1 signal or the L2 signal comprises a MAC-CE.

Aspect 16: The method of any of aspects 12 through 15, wherein transmitting the L1 signal or the L2 signal indicating the second set of configuration parameters comprises: transmitting DCI indicating the second set of configuration parameters, wherein the TRSs comprise periodic or semi-persistent TRSs.

Aspect 17: The method of aspect 16, further comprising: transmitting an RRC message indicating a table comprising the second set of configuration parameters; and transmitting the DCI indicating the second set of configuration parameters based at least in part on transmitting the RRC message.

Aspect 18: The method of any of aspects 12 through 17, further comprising: receiving an acknowledgement message based at least in part on transmitting the L1 signal or the L2 signal.

Aspect 19: The method of any of aspects 12 through 18, wherein the first set of configuration parameters and the second set of configuration parameters comprise at least one of a dynamic activation for semi-persistent TRSs, a dynamic deactivation for semi-persistent TRSs, a periodicity, a density in a frequency domain, a power boost, a bandwidth, a location within a BWP, a quantity of symbols, a time gap, or any combination thereof Aspect 20: The method of any of aspects 12 through 19, wherein each configuration parameter of the first set of configuration parameters and each configuration parameter of the second set of configuration parameters corresponds to a resource set identifier.

Aspect 21: The method of any of aspects 12 through 20, wherein transmitting the one or more TRSs comprises: transmitting one or more periodic TRSs, one or more semi-persistent TRSs, one or more aperiodic TRSs, or any combination thereof.

Aspect 22: The method of any of aspects 12 through 21, wherein the UE operates in a sub-THz band.

Aspect 23: An apparatus for wireless communications at a UE, comprising a processor; memory coupled with the processor; and one or more instructions stored in the memory and executable by the processor to cause the apparatus to, based at least in part on the one or more instructions, perform a method of any of aspects 1 through 11.

Aspect 24: An apparatus for wireless communications at a UE, comprising at least one means for performing a method of any of aspects 1 through 11.

Aspect 25: A non-transitory computer-readable medium storing code for wireless communications at a UE, the code comprising instructions executable by a processor to perform a method of any of aspects 1 through 11.

Aspect 26: An apparatus for wireless communications at a base station, comprising a processor; memory coupled with the processor; and instructions stored in the memory and executable by the processor to cause the apparatus to perform a method of any of aspects 12 through 22.

Aspect 27: An apparatus for wireless communications at a base station, comprising at least one means for performing a method of any of aspects 12 through 22.

Aspect 28: A non-transitory computer-readable medium storing code for wireless communications at a base station, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving a message indicating a first set of configuration parameters for tracking reference signals that are specific to the UE;
    monitoring, during a first time interval, for one or more tracking reference signals according to the first set of configuration parameters based at least in part on the message;
    receiving a layer-1 signal or a layer-2 signal indicating a second set of configuration parameters for tracking reference signals that are specific to the UE, wherein the second set of configuration parameters is different from the first set of configuration parameters; and
    monitoring, during a second time interval subsequent the first time interval, for one or more additional tracking reference signals according to the second set of configuration parameters based at least in part on receiving the layer-1 signal or the layer-2 signal.

2. The method of claim 1, wherein receiving the layer-1 signal or the layer-2 signal indicating the second set of configuration parameters comprises:
    receiving a medium access control control element indicating the second set of configuration parameters, wherein the tracking reference signals comprise semi-persistent tracking reference signals.

3. The method of claim 2, further comprising:
    receiving the medium access control control element indicating the second set of configuration parameters, wherein the medium access control element comprises a bitmap that indicates a subset of configuration parameters of the second set of configuration parameters; and
    monitoring, during the second time interval, for the one or more additional tracking reference signals according to the subset of configuration parameters based at least in part on receiving the medium access control control element.

4. The method of claim 1, further comprising:
receiving a radio resource control message indicating a plurality of sets of configuration parameters for tracking reference signals that are specific to the UE that comprises the second set of configuration parameters, wherein the tracking reference signals comprise periodic or semi-persistent tracking reference signals; and
receiving the layer-1 signal or the layer-2 signal indicating the second set of configuration parameters, wherein the layer-1 signal or the layer-2 signal comprises a medium access control control element.

5. The method of claim 1, wherein receiving the layer-1 signal or the layer-2 signal indicating the second set of configuration parameters comprises:
receiving downlink control information indicating the second set of configuration parameters, wherein the tracking reference signals comprise periodic or semi-persistent tracking reference signals.

6. The method of claim 5, further comprising:
receiving a radio resource control message indicating a table comprising the second set of configuration parameters; and
receiving the downlink control information indicating the second set of configuration parameters based at least in part on receiving the radio resource control message.

7. The method of claim 1, further comprising:
transmitting an acknowledgement message based at least in part on receiving the layer-1 signal or the layer-2 signal.

8. The method of claim 1, wherein the first set of configuration parameters and the second set of configuration parameters comprise at least one of a dynamic activation for semi-persistent tracking reference signals, a dynamic deactivation for semi-persistent tracking reference signals, a periodicity, a density in a frequency domain, a power boost, a bandwidth, a location within a bandwidth part, a quantity of symbols, a time gap, or any combination thereof.

9. The method of claim 1, wherein each configuration parameter of the first set of configuration parameters and each configuration parameter of the second set of configuration parameters corresponds to a resource set identifier.

10. The method of claim 1, wherein monitoring for the one or more tracking reference signals comprises:
monitoring for one or more periodic tracking reference signals, one or more semi-persistent tracking reference signals, one or more aperiodic tracking reference signals, or any combination thereof.

11. The method of claim 1, wherein the UE operates in a sub-terahertz band.

12. A method for wireless communications at a network entity, comprising:
transmitting a message indicating a first set of configuration parameters for tracking reference signals that are specific to a user equipment (UE);
transmitting, during a first time interval, one or more tracking reference signals according to the first set of configuration parameters based at least in part on transmitting the message;
transmitting a layer-1 signal or a layer-2 signal indicating a second set of configuration parameters for tracking reference signals that are specific to the UE, wherein the second set of configuration parameters is different from the first set of configuration parameters; and
transmitting, during a second time interval subsequent the first time interval, one or more additional tracking reference signals according to the second set of configuration parameters based at least in part on transmitting the layer-1 signal or the layer-2 signal.

13. The method of claim 12, wherein transmitting the layer-1 signal or the layer-2 signal indicating the second set of configuration parameters comprises:
transmitting a medium access control control element indicating the second set of configuration parameters, wherein the tracking reference signals comprise semi-persistent tracking reference signals.

14. The method of claim 13, further comprising:
transmitting the medium access control control element indicating the second set of configuration parameters, wherein the medium access control element comprises a bitmap that indicates a subset of configuration parameters of the second set of configuration parameters; and
transmitting, during the second time interval, the one or more additional tracking reference signals according to the subset of configuration parameters based at least in part on transmitting the medium access control control element.

15. The method of claim 12, further comprising:
transmitting a radio resource control message indicating a plurality of sets of configuration parameters for tracking reference signals that are specific to the UE that comprises the second set of configuration parameters, wherein the tracking reference signals comprise periodic or semi-persistent tracking reference signals; and
transmitting the layer-1 signal or the layer-2 signal indicating the second set of configuration parameters, wherein the layer-1 signal or the layer-2 signal comprises a medium access control control element.

16. The method of claim 12, wherein transmitting the layer-1 signal or the layer-2 signal indicating the second set of configuration parameters comprises:
transmitting downlink control information indicating the second set of configuration parameters, wherein the tracking reference signals comprise periodic or semi-persistent tracking reference signals.

17. The method of claim 16, further comprising:
transmitting a radio resource control message indicating a table comprising the second set of configuration parameters; and
transmitting the downlink control information indicating the second set of configuration parameters based at least in part on transmitting the radio resource control message.

18. The method of claim 12, further comprising:
receiving an acknowledgement message based at least in part on transmitting the layer-1 signal or the layer-2 signal.

19. The method of claim 12, wherein the first set of configuration parameters and the second set of configuration parameters comprise at least one of a dynamic activation for semi-persistent tracking reference signals, a dynamic deactivation for semi-persistent tracking reference signals, a periodicity, a density in a frequency domain, a power boost, a bandwidth, a location within a bandwidth part, a quantity of symbols, a time gap, or any combination thereof.

20. The method of claim 12, wherein each configuration parameter of the first set of configuration parameters and each configuration parameter of the second set of configuration parameters corresponds to a resource set identifier.

21. The method of claim 12, wherein transmitting the one or more tracking reference signals comprises:

transmitting one or more periodic tracking reference signals, one or more semi-persistent tracking reference signals, one or more aperiodic tracking reference signals, or any combination thereof.

22. The method of claim 12, wherein the UE operates in a sub-terahertz band.

23. An apparatus for wireless communications at a user equipment (UE), comprising:
a processor;
memory coupled with the processor; and
one or more instructions stored in the memory and executable by the processor to cause the apparatus to, based at least in part on the one or more instructions:
receive a message indicating a first set of configuration parameters for tracking reference signals that are specific to the UE;
monitor, during a first time interval, for one or more tracking reference signals according to the first set of configuration parameters based at least in part on the message;
receive a layer-1 signal or a layer-2 signal indicating a second set of configuration parameters for tracking reference signals that are specific to the UE, wherein the second set of configuration parameters is different from the first set of configuration parameters; and
monitor, during a second time interval subsequent the first time interval, for one or more additional tracking reference signals according to the second set of configuration parameters based at least in part on receiving the layer-1 signal or the layer-2 signal.

24. The apparatus of claim 23, wherein the instructions to receive the layer-1 signal or the layer-2 signal indicating the second set of configuration parameters are executable by the processor to cause the apparatus to:
receive a medium access control control element indicating the second set of configuration parameters, wherein the tracking reference signals comprise semi-persistent tracking reference signals.

25. The apparatus of claim 24, wherein the instructions are further executable by the processor to cause the apparatus to:
receive the medium access control control element indicating the second set of configuration parameters, wherein the medium access control control element comprises a bitmap that indicates a subset of configuration parameters of the second set of configuration parameters; and
monitor, during the second time interval, for the one or more additional tracking reference signals according to the subset of configuration parameters based at least in part on receiving the medium access control control element.

26. The apparatus of claim 23, wherein the instructions are further executable by the processor to cause the apparatus to:
receive a radio resource control message indicating a plurality of sets of configuration parameters for tracking reference signals that are specific to the UE that comprises the second set of configuration parameters, wherein the tracking reference signals comprise periodic or semi-persistent tracking reference signals; and
receive the layer-1 signal or the layer-2 signal indicating the second set of configuration parameters, wherein the layer-1 signal or the layer-2 signal comprises a medium access control control element.

27. An apparatus for wireless communications at a network entity, comprising:
a processor;
memory coupled with the processor; and
one or more instructions stored in the memory and executable by the processor to cause the apparatus to, based at least in part on the one or more instructions:
transmit a message indicating a first set of configuration parameters for tracking reference signals that are specific to a user equipment (UE);
transmit, during a first time interval, one or more tracking reference signals according to the first set of configuration parameters based at least in part on transmitting the message;
transmit a layer-1 signal or a layer-2 signal indicating a second set of configuration parameters for tracking reference signals that are specific to the UE, wherein the second set of configuration parameters is different from the first set of configuration parameters; and
transmit, during a second time interval subsequent the first time interval, one or more additional tracking reference signals according to the second set of configuration parameters based at least in part on transmitting the layer-1 signal or the layer-2 signal.

28. The apparatus of claim 27, wherein the instructions to transmit the layer-1 signal or the layer-2 signal indicating the second set of configuration parameters are executable by the processor to cause the apparatus to:
transmit a medium access control control element indicating the second set of configuration parameters, wherein the tracking reference signals comprise semi-persistent tracking reference signals.

29. The apparatus of claim 28, wherein the instructions are further executable by the processor to cause the apparatus to:
transmit the medium access control control element indicating the second set of configuration parameters, wherein the medium access control control element comprises a bitmap that indicates a subset of configuration parameters of the second set of configuration parameters; and
transmit, during the second time interval, the one or more additional tracking reference signals according to the subset of configuration parameters based at least in part on transmitting the medium access control control element.

30. The apparatus of claim 27, wherein the instructions are further executable by the processor to cause the apparatus to:
transmit a radio resource control message indicating a plurality of sets of configuration parameters for tracking reference signals that are specific to the UE that comprises the second set of configuration parameters, wherein the tracking reference signals comprise periodic or semi-persistent tracking reference signals; and
transmit the layer-1 signal or the layer-2 signal indicating the second set of configuration parameters, wherein the layer-1 signal or the layer-2 signal comprises a medium access control control element.

* * * * *